US008219673B2

(12) United States Patent
Uyama et al.

(10) Patent No.: US 8,219,673 B2
(45) Date of Patent: Jul. 10, 2012

(54) ANALYSIS APPARATUS, ANALYSIS METHOD AND RECORDING MEDIUM FOR RECORDING ANALYSIS PROGRAM

(75) Inventors: Masashi Uyama, Kawasaki (JP); Youji Kohda, Kawasaki (JP); Satoru Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 73 days.

(21) Appl. No.: 12/411,930

(22) Filed: Mar. 26, 2009

(65) Prior Publication Data
US 2009/0248863 A1    Oct. 1, 2009

(30) Foreign Application Priority Data
Mar. 28, 2008 (JP) .................. 2008-088020

(51) Int. Cl.
*G06F 15/173* (2006.01)
(52) U.S. Cl. ....................................... 709/224
(58) Field of Classification Search .................. 709/224
See application file for complete search history.

(56) References Cited

U.S. PATENT DOCUMENTS

| 6,061,437 | A * | 5/2000 | Yoon .............................. 379/156 |
| 2006/0218278 | A1 * | 9/2006 | Uyama et al. ................. 709/226 |
| 2008/0154821 | A1 * | 6/2008 | Poulin .............................. 706/21 |
| 2008/0294996 | A1 * | 11/2008 | Hunt et al. ..................... 715/739 |

FOREIGN PATENT DOCUMENTS
JP    2006-268529    10/2006

OTHER PUBLICATIONS

Toyoda, Hideki, "Komoku Hanno Riron (Nyumon Hen) (Item Response Theory (Intoduction))", Preface, Asakura Publishing, 2002.
Toyoda, Hideki, "Komoku Hanno Riron (Riron Hen) (Item Response Theory (Intoduction))", Preface, Asakura Publishing, 2003.
"Runexy", [online], Internet < U R L : http://www.runexy.co.jp/en/software>, retrieved Mar. 19, 2008.
"Urchin", online, Internet < U R L : http://www.proton.co.jp/products/urchin/index.html>, retrieved Mar. 19, 2008.
"SiteTracker8", [online], Internet < U R L : http://netinsight.unica.com/NetTracker.htm>, retrieved Mar. 19, 2008.
"SiteCatalyst", [online], Internet < U R L : http://www.omniture.co.jp/products/web_analytics>, retrieved Mar. 19, 2008.
"Analytics8", [online], Internet < U R L : http://www.webtrends.com>, retrieved Mar. 19, 2008.
"The R Project for Statistical Computing", [online], Internet < U R L : http://www.r-project.org/index.html>, retrieved Mar. 19, 2008.

* cited by examiner

*Primary Examiner* — Hussein Elchanti
*Assistant Examiner* — Maceeh Anwari
(74) *Attorney, Agent, or Firm* — Staas & Halsey LLP

(57) ABSTRACT

An analysis apparatus includes a history analysis part analyzing the trend based on the access log and deriving the latent trait to an access destination, a principal components analysis part analyzing principal components of the frequency distribution of the access, a classification part classifying the correlation of the principal components into plural classes, an event recording part recording the events to induce to the access destination, a first generating part generating a latent trait principal component table; a second generating part generating a class construction ratio table stored the class as the result of classification, a third generating part generating an event classification table stored the class and the contents of the event, and an analysis result recording part recording the latent trait principal component table, the class construction ratio table and the event classification table, as an event feature model of the effect on the execution of the event.

15 Claims, 24 Drawing Sheets

FIG. 3

| SESSION ID | HOST ID | ACCESS DATE | ACCESS TIME | ACCESS DESTINATION (URL) |
|---|---|---|---|---|
| 2343 | AAA | 2007/9/30 | 12:00:00 | /home.html |
| 2367 | BBB | 2007/9/30 | 12:00:01 | /request.html |
| 2343 | AAA | 2007/9/30 | 12:00:05 | /jump.html |
| 2343 | AAA | 2007/9/30 | 12:02:23 | /quit.html |
| 2368 | CCC | 2007/9/30 | 12:04:51 | /home.html |
| ... | ... | ... | ... | ... |

FIG. 4

| EXECUTION DATE | EVENT CONTENT | | |
| --- | --- | --- | --- |
| | EVENT TYPE | EVENT SIZE | NUMBER OF ELAPSED DAYS |
| 2007/3/30 | DISCOUNT | 10% | 1ST DAY |
| 2007/3/31 | DISCOUNT | 10% | 2ND DAY |
| 2007/4/1 | DISCOUNT | 10% | 3RD DAY |
| 2007/4/2 | DISCOUNT | 10% | 4TH DAY |
| 2007/4/3 | BANNER AD | 400 | 1ST DAY |
| 2007/5/15 | BANNER AD | 500 | 1ST DAY |
| ... | ... | ... | ... |

FIG. 6

| SESSION ID | URL1 | URL2 | URL3 | URL4 | URL5 | URL6 | URL7 | URL8 | URL9 | URL10 |
|---|---|---|---|---|---|---|---|---|---|---|
| SID1 | 0 | 1 | 0 | 0 | 1 | 1 | 1 | 0 | 0 | 0 |
| SID2 | 0 | 0 | 0 | 0 | 1 | 0 | 1 | 1 | 1 | 1 |
| SID3 | 0 | 0 | 0 | 0 | 1 | 0 | 0 | 1 | 0 | 0 |
| SID4 | 1 | 1 | 1 | 1 | 1 | 1 | 1 | 1 | 0 | 0 |
| SID5 | 0 | 1 | 0 | 0 | 0 | 0 | 1 | 1 | 0 | 1 |
| SID6 | 0 | 1 | 1 | 0 | 0 | 1 | 1 | 0 | 0 | 0 |
| ... | ... | ... | ... | ... | ... | ... | ... | ... | ... | ... |

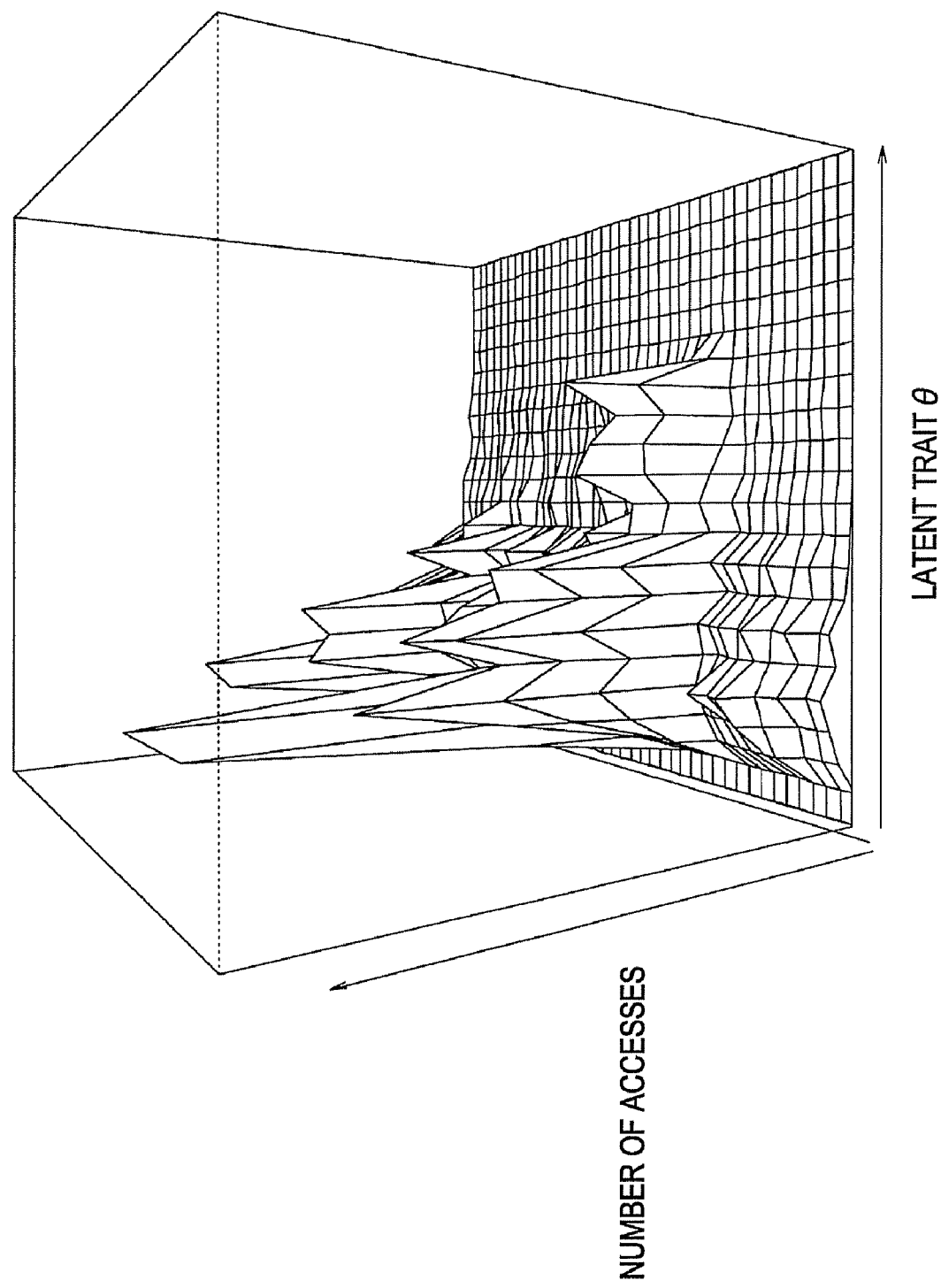

FIG. 14

| PRINCIPAL COMPONENT BASE | $\theta 1$ | $\theta 2$ | $\theta 3$ | ... | $\theta 20$ |
|---|---|---|---|---|---|
| 1ST PRINCIPAL COMPONENT | 0.0 | 0.0 | 0.16 | ... | 0.0 |
| 2ND PRINCIPAL COMPONENT | 0.0 | 0.0 | 0.18 | ... | 0.0 |
| 3RD PRINCIPAL COMPONENT | 0.0 | -0.3 | 0.18 | ... | 0.0 |

FIG. 18

| CLASSIFICATION DATE | CLASS TYPE | SIZE COEFFICIENT | 1ST PRINCIPAL COMPONENT | 2ND PRINCIPAL COMPONENT | 3RD PRINCIPAL COMPONENT |
|---|---|---|---|---|---|
| 2007/3/1 | TYPE 1 | 515.9279068 | −0.7762 | −0.7553 | 0.148272 |
| 2007/3/2 | TYPE 1 | 460.8722129 | −0.7762 | −0.7553 | 0.148272 |
| 2007/3/3 | TYPE 1 | 306.9485915 | −0.7762 | −0.7553 | 0.148272 |
| 2007/3/4 | TYPE 1 | 271.4874228 | −0.7762 | −0.7553 | 0.148272 |
| 2007/3/5 | TYPE 2 | 308.8174953 | −0.84607 | 0.043599 | 0.108184 |
| 2007/3/6 | TYPE 2 | 313.5501832 | −0.84607 | 0.043599 | 0.108184 |
| 2007/3/7 | TYPE 2 | 378.9294042 | −0.84607 | 0.043599 | 0.108184 |
| 2007/3/8 | TYPE 2 | 406.0809475 | −0.84607 | 0.043599 | 0.108184 |
| 2007/3/9 | TYPE 2 | 293.1333786 | −0.84607 | 0.043599 | 0.108184 |
| 2007/3/10 | TYPE 2 | 277.4275964 | −0.84607 | 0.043599 | 0.108184 |
| 2007/3/11 | TYPE 2 | 290.3695786 | −0.84607 | 0.043599 | 0.108184 |
| 2007/3/12 | TYPE 2 | 299.6966857 | −0.84607 | 0.043599 | 0.108184 |
| 2007/3/13 | TYPE 3 | 276.0535256 | −0.70695 | 0.202541 | 0.090506 |
| 2007/3/14 | TYPE 2 | 341.381847 | −0.84607 | 0.043599 | 0.108184 |
| 2007/3/15 | TYPE 2 | 281.5601684 | −0.84607 | 0.043599 | 0.108184 |
| 2007/3/16 | TYPE 3 | 190.6592223 | −0.70695 | 0.202541 | 0.090506 |
| ... | ... | ... | ... | ... | ... |

FIG. 19

| CLASS TYPE | 1ST PRINCIPAL COMPONENT | 2ND PRINCIPAL COMPONENT | 3RD PRINCIPAL COMPONENT |
|---|---|---|---|
| TYPE 1 | 0.7 | 0.1 | −0.2 |
| TYPE 2 | 0.6 | −0.1 | 0.3 |
| TYPE 3 | 0.5 | 0.4 | −0.1 |
| ... | ... | ... | ... |

FIG. 20

| EVENT CONTENT | | CLASS TYPE | SIZE COEFFICIENT |
|---|---|---|---|
| EVENT TYPE AND SIZE | NUMBER OF ELAPSED DAYS | | |
| 10% OFF | 1ST DAY | TYPE 1 | 200 |
| 10% OFF | 2ND DAY | TYPE 1 | 400 |
| 10% OFF | 3RD DAY | TYPE 1 | 800 |
| 10% OFF | 4TH DAY | TYPE 1 | 350 |
| BANNER AD | 1ST DAY | TYPE 2 | 700 |
| BANNER AD | 1ST DAY | TYPE 2 | 400 |
| BANNER AD | 2ND DAY | TYPE 2 | 300 |
| ... | ... | ... | ... |

FIG. 22

| NUMBER OF ELAPSED DAYS | CLASS TYPE | SIZE COEFFICIENT |
|---|---|---|
| 1ST DAY | TYPE 1 | 200 |
| 2ND DAY | TYPE 1 | 400 |
| 3RD DAY | TYPE 1 | 800 |
| 4TH DAY | TYPE 1 | 350 |

ANALYSIS APPARATUS, ANALYSIS METHOD AND RECORDING MEDIUM FOR RECORDING ANALYSIS PROGRAM

CROSS-REFERENCE TO RELATED APPLICATIONS

This application is based upon and claims the benefit of priority of the prior related to, and claims priority under 35 U.S.C §119(a) on, Japanese Patent Application No. 2008-88020 filed on Mar. 28, 2008, the entire contents of which are incorporated herein by reference.

FIELD

The embodiments discussed herein are related to an analysis apparatus for analyzing the access to the access destination on a network, an analysis method carried out by the analysis apparatus and a recording medium for recording the analysis program to realize the analysis apparatus.

BACKGROUND

In a web site accessed through the communication network such as the Internet, commercial campaigns including a price discount, a premium sale and advertisement are often conducted in order to acquire new customers and increase sales. A campaign promoter is required to form a plan to maximize cost effectiveness by considering what kind of incentives are provided in what amount and what amount of advertisements is made for how long.

However, the campaign, if conducted as planned may not produce the effects expected initially. A campaign conducted exactly under the same conditions as those of the previously conducted campaigns, for example, may not produce the same effect as the previous campaigns in the case where the interest or preferences of the users is changed. Even during the campaign period, therefore, it is important to change and correct a plan dynamically while watching on reactions of customers to approach an original target as far as possible.

In the case where a long-term campaign of several days to several months is carried out on the web site, an access situation of the first day of the campaign is analyzed and a cause of a difference between predicted sales and an actual sale result is preferably analyzed. Based on the cause of the difference, a policy for a subsequent campaign period may be additionally corrected. If this is possible, new customers may be acquired and the sales may be increased to a target of the initially predicted sales. For this purpose, various applications that are software for access analysis have been placed on the market. A result searched on the internet (as of Mar. 19, 2008) is found that the following applications are now commercially available:

"Urchin", [online] [retrieved Mar. 19, 2008], Internet <URL: English Site http://www.runexy.co.jp/en/ Japanese Site http://www.proton.co.jp/products/urchin/index.html>

"SiteTracker8", [online] [retrieved Mar. 19, 2008], Internet <URL: http://www.sitetracker.jp/>

"SiteCatalyst", [online] [retrieved Mar. 19, 2008], Internet <URL: http://www.omniture.co.jp/products/web analytics>

"Analytics8", [online] [retrieved Mar. 19, 2008], Internet <URL: http://www.samuraiz.co.jp/product/webtrends/>

Using access analysis applications that are software now available on the market, achievements of such items as a number of users who have accessed the web site, a number of purchasers, a conversion rate and sales amount may be calculated by analyzing the access history at the end of the first day of the campaign. Incidentally, the conversion rate is defined as a ratio in which the users who have accessed a specified access destination such as the first web page or a banner advertisement leading to a particular web page have finally accessed the web page including a preset target access destination. The web page making up the target access destination is the one which displays "Thank you very much" upon complete purchase, the one of which the literature has been claimed or the one indicating the completion of membership registration. These web pages are set for each web site. The access to the web page including the target access destination indicates such acts as the commodity purchase, the request for the literature and the membership registration.

Also, in Japanese Unexamined Patent Publication No. 2006-268529, a system for carrying out the access analysis by modeling the behavior of the user mass against the campaign is discussed.

SUMMARY

An analysis apparatus that is able to access and analyze the contents recorded in a history recording part that records access records to access destinations accessed by user terminals via a communication network.

An analysis apparatus includes a history analysis part analyzing a trend of the access history for each unit period and deriving a latent trait indicating the latent possibility of access to a preset target access destination for each session from the contents recorded in the history recording part that records, for each session, the access history indicating the access or non-access to the access destination and the preset target access destination, a principal components analysis part analyzing principal components of the frequency distribution of the access corresponding to the latent trait for each unit period derived by the history analysis part, a classification part classifying a correlation of the principal components for each unit period into a plurality of classes based on the analysis result of the principal components, an event recording part recording, for each unit period, the contents of events executed to induce the access to the target access destination, a first generating part deriving the distribution of internal latent traits for each principal component and generating a latent trait principal component table stored the principal component and the distribution of the latent trait in correspondence with each other, a second generating part generating a class construction ratio table stored, in correspondence with each other, the class as a result of classification by the classification part and the principal component construction ratio based on the correlation of the principal components for each class, a third generating part generating an event classification table stored, in correspondence with each other for each unit period, the class as a result of classification by the classification part and the contents of the event recorded in the event recording part, and an analysis result recording part recording the latent trait principal component table generated by the first generating part, the class construction ratio table generated by the second generating part and the event classification table generated by the third generating part, as an event feature model of the effect on the execution of the event.

An analysis method for causing a computer to function as an analysis apparatus which is able to access and analyze contents recorded in a history recording log file that records access records to access destinations accessed by user terminals via a communication network, the analysis method for causing the computer to execute analyzing a trend of the access history for each unit period and deriving the latent trait indicating a latent possibility of access to a preset target access destination for each session from the contents recorded in a history recording part that records, for each session, the access history indicating an access or non-access to the access destination and the preset target access destination, analyzing principal components of a frequency distribution of the access corresponding to the latent trait for each unit period derived by the analyzing, deriving the distribution of internal latent traits for each principal component and generating a latent trait principal component table stored the principal component and the distribution of the latent trait in correspondence with each other, classifying a correlation of the principal components for each unit period into a plurality of classes based on the analysis result of the principal components executed in the analyzing, recording, for each unit period, the contents of events executed to induce the access to the target access destination, generating a class construction ratio table stored, in correspondence with each other, the class as a result of classification by the classifying and the principal component construction ratio based on the correlation of the principal components for each class, generating an event classification table stored, in correspondence with each other for each unit period, the class as a result of classification by the classifying and the contents of the event executed for each period to induce to the target access destination, and recording the latent trait principal component table generated by the first generating, the class construction ratio table generated by the second generating and the event classification table generated by the third generating, as an event feature model of the effect on the execution of the event.

The object and advantages of the embodiment discussed herein will be realized and attained by means of elements and combinations particularly pointed out in the claims.

It is to be understood that both the foregoing general description and the following detailed and the following detailed description are exemplary and only are not restrictive exemplary explanatory are not restrictive of the invention, as claimed.

BRIEF DESCRIPTION OF THE DRAWINGS

FIG. 3 is a diagram for conceptually explaining an example of the contents of a record in a web log recording part included in the analysis apparatus according to an embodiment;

FIG. 4 is a diagram for conceptually explaining an example of the contents of a record in an event recording part included in the analysis apparatus according to an embodiment;

FIG. 6 is a diagram for explaining an example of an access history generated by the analysis apparatus according to an embodiment;

FIG. 11 is a three-dimensional graph depicting an example of a frequency distribution table indicating a number of accesses for each unit period and each latent trait derived by the analysis apparatus according to an embodiment;

FIG. 14 is a diagram depicting an example of the latent trait principal component table generated by the analysis apparatus according to an embodiment;

FIG. 18 is a diagram for explaining an example of the result of the classification by the analysis apparatus according to an embodiment;

FIG. 19 is a diagram depicting an example of a class construction ratio table generated by the analysis apparatus according to an embodiment;

FIG. 20 is a diagram depicting an example of an event classification table generated by the analysis apparatus according to an embodiment;

FIG. 22 is a diagram depicting an example of the prediction process in progress in the analysis apparatus according to an embodiment;

DESCRIPTION OF EMBODIMENTS

Embodiments discussed herein are explained in detail below with reference to the drawings depicting a mode of carrying out the embodiments. An explanation is given about a manner in which an analysis method according to the embodiments is realized by an analysis apparatus using a computer. Incidentally, a provider and a customer are, in convenience, defined and referred in the following description. One of a party who manages or entrusts management of a web site provided through the communication network such as the Internet and who provides services including a commodity sale, provision of literature or management and operation of a society with customers registered therein is called as a provider. Also, a user such as a customer who accesses the web site provided by the provider using the computer such as a personal computer and who enjoys the services such as commodity purchase, a request for materials or membership registration are referred to as the user, in convenience.

The analysis method according to the embodiments discussed herein is used for analyzing the access to the web site provided through the communication network. The web site is defined as a mass of web pages including plural access destinations. An access destination is a URL (Uniform Resource Locator) designating a position of a resource such as a program or a file on the communication network. In the description that follows, one of the plural access destinations is assumed to be preset as a target access destination. The target access destination is defined as a URL of the web page displaying a wording "Thank you very much" at a time of, for example, complete purchase, or the web page set for each web site such as the web page for completion of a literature request, the web page for completion of the membership registration. Specifically, the party providing the web site intends to guide the user such as a customer to access the target access destination to purchase a commodity, request the literature or register as a member.

The analysis apparatus according to the embodiment discussed herein analyzes the effects of execution of an event. The event is defined as, for example, a commercial event or a campaign such as the acquisition of new customers carried out by or at the request of the provider, the price discount made for the purpose of increasing the sales, the premium sale or the advertisement.

Figure 1:
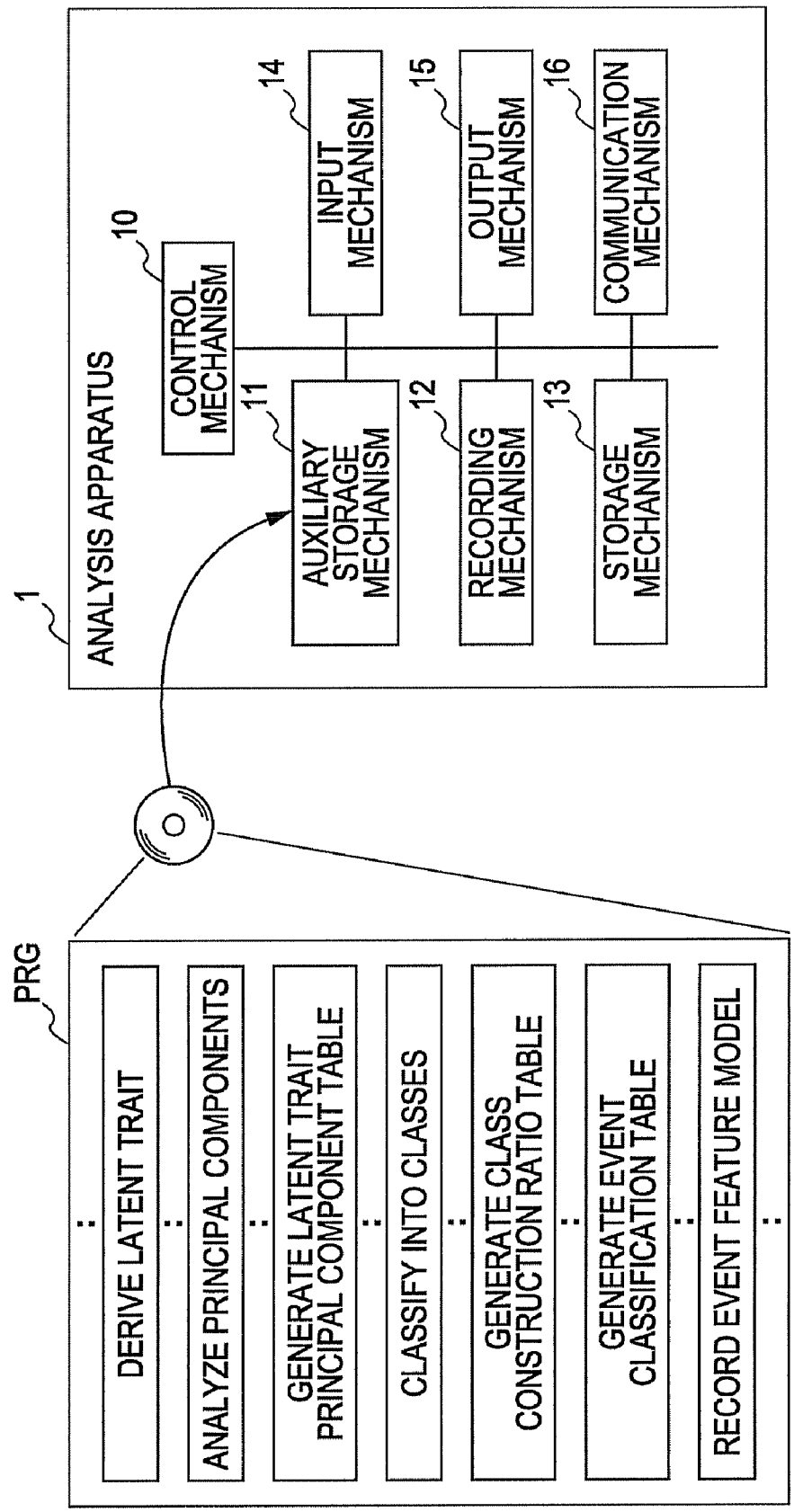
FIG. 1 is a block diagram depicting an example of the hardware configuration of an analysis apparatus according to an embodiment.

FIG. 1 is a block diagram depicting an example of the hardware configuration of the analysis apparatus according to the embodiment discussed herein. The analysis apparatus 1 depicted in FIG. 1 uses a computer such as a personal computer. The analysis apparatus 1 includes a control mechanism 10, an auxiliary storage mechanism 11, a recording mechanism 12 and a storage mechanism 13. The control mechanism 10 is a CPU or the like for controlling the whole apparatus. The auxiliary storage mechanism 11 is a CD-ROM drive or the like for reading the various information from the recording medium such as the CD-ROM recording various information including data and the analysis program PRG or other program according to the embodiment discussed herein. The recording mechanism 12 is a hard disk or the like mechanism for recording various information read by the auxiliary storage mechanism 11. The storage mechanism 13 is a RAM or the like mechanism for storing the information generated temporarily. The computer operates as the analysis apparatus 1 according to the embodiment discussed herein by causing the analysis program PRG recorded in the recording mechanism 12 to be stored in the storage mechanism 13 and executed under the control of the control mechanism 10.

Further, the analysis apparatus 1 is configured, for example, of an input mechanism 14 such as a mouse and a keyboard, an output mechanism 15 such as a monitor or a printer and a communication mechanism 16 such as a communication port connected to the communication network such as LAN or internet.

Figure 2:
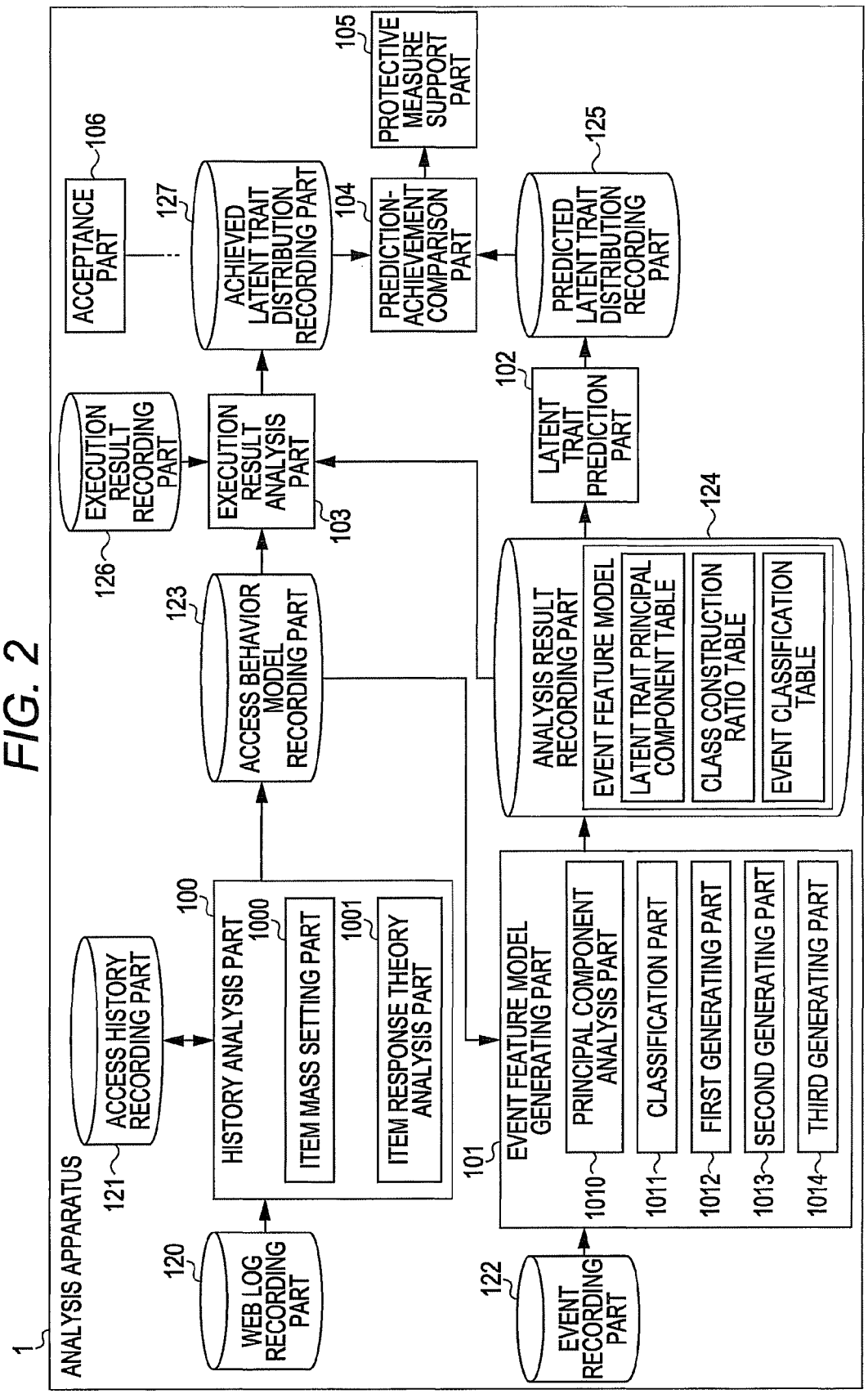
FIG. 2 is a function block diagram depicting an example of the functional configuration of the analysis apparatus according to an embodiment.

FIG. 2 is a function block diagram depicting an example of functional configuration of the analysis apparatus 1 according to the embodiment discussed herein. In the analysis apparatus 1, the analysis program PRG according to the embodiment discussed herein and recorded in the recording mechanism 12 is executed under the control of the control mechanism 10 thereby to activate the various functions such as a history analysis part 100, an event feature model generating part 101, a latent trait prediction part 102, an execution result analysis part 103, a prediction-achievement comparison part 104, a protective measure support part 105 and an acceptance part 106.

The history analysis part 100 is a program module for analyzing the behavior related to the access of the user based on the web log and includes an item mass setting part 1000 and an item response theory analysis part 1001. The item mass setting part 1000 is a program module for generating an access history in matrix indicating the access or non-access to the access destination and the preset target access destination based on the web log. The item response theory analysis part 1001 is a program module for deriving the latent traits indicating the latent possibility of access to the target access destination based on the access history in matrix generated by the item mass setting part 1000.

The event feature model generating part 101 is a program module for generating an event feature model that is a modeled effect on the event execution. The event feature model generating part 101 includes a principal component analysis part 1010, a classification part 1011, a first generating part 1012, a second generating part 1013 and a third generating part 1014. The principal components analysis part 1010 is a program module for analyzing principal components in the frequency distribution of the latent traits for each unit period. The classification part 1011 is a program module for classifying the correlation between the principal components into plural classes. The first generating part 1012 is a program module for generating, as one of the event feature models, a latent trait principal component table indicating the correspondence between the principal components and the latent traits. The second generating part 1013 is a program module for generating; as one of the event feature models, a class construction ratio table indicating the correspondence between the class and the construction ratio of principal components based on the correlation between the principal components for each class. The third generating part 1014 is a program module for generating, as one of the event feature models, an event classification table indicating the correspondence between the class and the contents of the event.

The latent trait prediction part 102 is a program module for deriving the distribution, as a prediction, of the latent traits with a scheduled event executed, on the basis of the contents of the scheduled event such as a scheduled campaign and an event feature model.

The execution result analysis part 103 is a program module for deriving the frequency distribution of the latent traits in the result of execution of the scheduled event.

The prediction-achievement comparison part 104 is a program module for comparing the predicted distribution of the latent traits with the frequency distribution of the latent traits based on the execution result of the scheduled event.

The protective measure support part 105 is a program module for deriving an event for obviating the difference between the prediction and the execution result of the distribution of the latent traits.

The acceptance part 106 is a program module for accepting the input of various pieces of information such as the web log, the target access destination, the contents of the scheduled events and the execution result. The acceptance part 106 is a program module for realizing the function as an interface to accept the input of the various pieces of information from the mechanisms such as the auxiliary storage mechanism 11, the recording mechanism 12, the input mechanism 14 and the communication mechanism 16. Specifically, the process executed by the acceptance part 106 to accept the input includes the process executed by the auxiliary storage mechanism 11 to read the information recorded in a recording medium, the process of reading the information recorded in the recording mechanism 12, the process executed by the operation of the operator to accept the information input from the input mechanism 14 and the process executed by the communication mechanism 16 to accept the information input from an external device. For example, the process of reading the information recorded in the various data bases using the area of the recording mechanism 12 described later is also executed by the acceptance part 106.

Also, in the analysis apparatus 1, the analysis program PRG recorded in the recording mechanism 12 according to the embodiment discussed herein is executed under the control of the control mechanism 10. In the process, the analysis apparatus 1 uses the recording area of the recording mechanism 12 as the various data bases for a web log recording part 120, an access history recording part 121, an event recording part 122, an access behavior model recording part 123, an analysis result recording part 124, a predicted latent trait distribution recording part 125, an execution result recording part 126 and an achieved latent trait distribution recording part 127. These data bases may not use the recording area of the recording mechanism 12 but may use, for example, the recording area of other devices or other recording media connected to the analysis apparatus 1.

The web log recording part 120 is a data base for recording the web log including the history of access to the web page.

The access history recording part 121 is a data base for recording the history of access in matrix generated based on the web log.

The event recording part 122 is a data base for recording the history of the contents of the event executed.

The access behavior model recording part 123 is a data base for recording the estimation value of the latent trait, etc. derived based on the access history, as an access behavior model of each behavior against each access destination of the user.

The analysis result recording part 124 is a data base for recording the model of the analysis result based on the access history recorded in the access history recording part 121 and the history of the contents of the event recorded in the event recording part 122, i.e. each event feature model generated by the event feature model generating part 101.

The predicted latent trait distribution recording part 125 is a data base for recording the distribution of the latent traits predicted in the case where a scheduled event is executed.

The execution result recording part 126 is a data base for recording the access history constituting the result of execution of a scheduled event.

The achieved latent trait distribution recording part 127 is a data base for recording the frequency distribution of the latent traits derived from the result of execution of a scheduled event.

FIG. 3 is a diagram for conceptually explaining an example of the contents recorded in the web log recording part 120 included in the analysis apparatus 1 according to the embodiment discussed herein. The web log recording part 120 records the web log as the data in units of record having such items as a session ID, a host ID, the access date, the access time and the access destination. The session ID is defined as specified information for specifying the session associated with the access to the web page provided by the provider. The host ID is defined as specified information for specifying the host of the access source. The access date is defined as the date at which the access is accepted. The access time is defined as the time at which the access user is accepted. Incidentally, the access destination indicates the URL accessed by the user. Various methods in execution may be used for specifying the session and assigning the session ID. For example, the host of the access source is specified, and the accesses within 30 minutes from the same host are specified as the accesses associated with the same session.

FIG. 4 is a diagram for conceptually explaining an example of the contents recorded in the event recording part 122 included in the analysis apparatus according the embodiment discussed herein. The event recording part 122 records the information related to the executed event as the data in units of record having such items as the execution date and the contents of the event. The execution date is defined as the year/month/day on which the event is executed. Incidentally, the hour may be also recorded as required. The contents of the event recorded include the information on such items as the event type, the event size and the elapsed number of days. The event type is defined as the type of the event executed such as "discount" and "banner advertisement". The event size is defined as the size of the event executed such as "10%" indicating a discount rate of the event type "discount" and "400" indicating the number of times the event type "banner advertisement" is carried out.

The contents recorded in the access history recording part 121, the access behavior model recording part 123, the analysis result recording part 124, a predicted latent trait distribution recording part 125, the execution result recording part 126 and the achieved latent trait distribution recording part 127 are described later.

Figure 5:
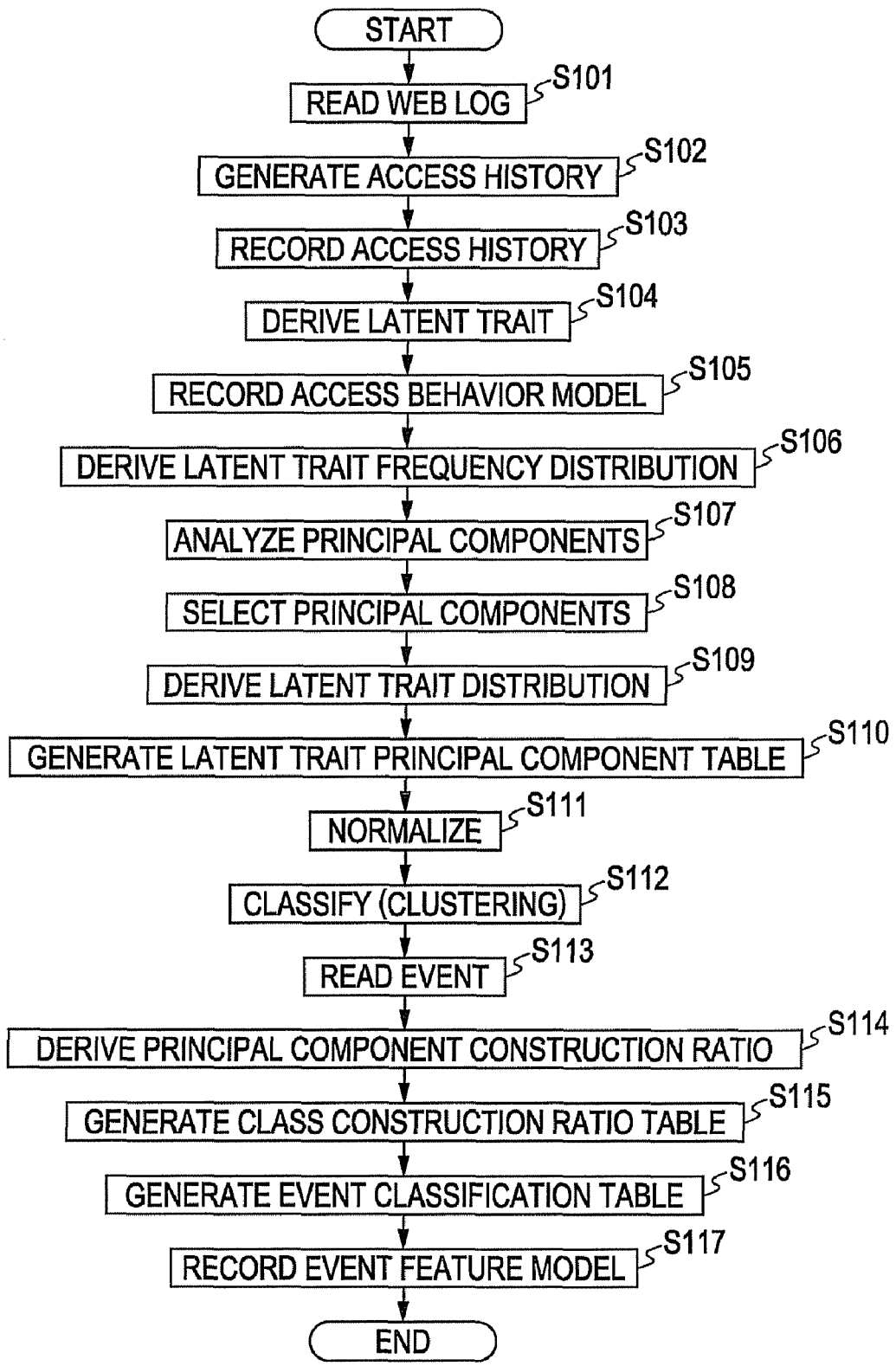
FIG. 5 is an operation chart depicting an example of an analysis process executed by the analysis apparatus according to an embodiment.

Next, the process executed by the analysis apparatus 1 according to the embodiment discussed herein is explained. FIG. 5 is an operation chart depicting an example of the analysis process executed by the analysis apparatus 1 according to the embodiment discussed herein. First, the process forming the base of the analysis process is explained, and the detail of each process is explained later. The analysis apparatus 1 reads the web log to be analyzed that is recorded beforehand in the web log recording part 120 by the process of the acceptance part 106 under the control of the control mechanism 10 executing the program such as the analysis program PRG (at S101). In operation S101, the acceptance part 106 executes the process of accepting the input of the web log. Also, the acceptance part 106 accepts the designation of the access destination including a constitution of the target access destination among the access destinations indicated in the web log.

In the analysis apparatus 1, the access history indicating the access or non-access to the access destination and the target access destination is generated based on the web log by the process executed by the item mass setting part 1000 under the control of the control mechanism 10 (at S102), and the access history thus generated is recorded in the access history recording part 121 (at S103). In operation S102, the access history is generated based on the Web log for the analysis period of, say, three months.

FIG. 6 is a diagram for explaining an example of the access history generated by the analysis apparatus 1 according to the embodiment discussed herein. The access history generated by the item mass setting part 1000 indicates in matrix the access or non-access to the access destination and the target access destination. In the access history depicted in FIG. 6, the expression such as "SID1" and "SID2" indicates the session ID. The expression "URL1" and "URL2" indicates the URLs of the access destination or the target access destination. For example, the "URL1" to "URL9" are the URLs of the access destinations, and the "ULR10" is the URL of the target access destination. In the access history indicated in matrix, "1" indicates that the access is accepted and "0" indicates that the access is not accepted. In the example shown in FIG. 6, the session specified as "SID1" indicates that although the access is made to the access destinations designated as "URL2", "URL5", "URL6" and "URL7", the target access destination is not accessed.

The continuation of the operation chart depicted in FIG. 5 is explained. In the analysis apparatus 1, the item response theory analysis part 1001, which is under the control of the control mechanism 10, reads the access history from the access history recording part 121. The item response theory analysis part 1001, by analyzing the trend of the access history by unit time such as one day, derives the latent trait indicating the latent possibility of access to the target access destination (at S104). The latent trait is defined as the latent possibility of access to the target access destination, i.e. the degree of the intention to purchase a commodity. For example, the session in which it is estimated from the access history that "the apparently interesting campaign accessed unexpectedly uninteresting" is low in latent trait. On the other hand, the session in which it is estimated from the access history that "the highly interested commodity was not finally purchased" is high in latent trait.

In the analysis apparatus 1, the estimated value of the latent trait derived by the process executed by the item response theory analysis part 1001 under the control of the control mechanism 10 is recorded in the access behavior model recording part 123 as an access behavior model of the access behavior of the user against each access destination (at S105).

In the analysis apparatus 1, the access behavior model is read from the access behavior model recording part 123 by the process executed by the principal components analysis part 1010 under the control of the control mechanism 10 thereby to derive the frequency distribution of the access for each trait at regular intervals of unit time (at S106), and the principal components are analyzed with respect to the frequency distribution of the latent traits derived for each unit time (at S107). The frequency distribution of the latent trait for unit period, say, each day is derived in the operation S106. The frequency distribution of the latent trait is defined as the count of the number of accesses for each value indicating the latent trait. This frequency distribution of the latent trait is derived for each unit period making up the analysis period.

Further, in the analysis apparatus 1, principal components are selected from plural principal components based on the analysis result thereof by the process executed by the principal components analysis part 1010 under the control of the control mechanism 10 at such a manner that the total contribution rate is not less than a given value (at S108). According to the conditions given for selection of principal components, for example, at least three principal components with the accumulated contribution rate of not less than 70% are selected. Subsequently, the various analysis processes are executed based on the principal components selected by the operation S108. By selecting a few principal components high in contribution rate, the access behavior model may be analyzed with a few parameters.

In the analysis apparatus 1, the distribution of the latent traits contained in the principal components selected by the operation S108 is derived by the process executed by the first generating part 1012 under the control of the control mechanism 10 (at S109) thereby to generate a latent trait principal component table indicating the correspondence between the principal components and the distribution of the latent traits (at S110).

In the analysis apparatus 1, the relation between the principal components selected by the operation S108 is normalized by the process executed by the classification part 1011 under the control of the control mechanism 10 (at S111). In operation S111, the relation between the selected principal components is normalized based on the result of dividing the score of the selected principal components by the size coefficient constituting the total absolute value of the score of the principal components for each unit time.

In the analysis apparatus 1, the correlation between the scores of the principal components normalized for each unit time is classified into plural classes (clusters) using the k-means clustering technique by the process executed by the classification part 1011 under the control of the control mechanism 10 (at S112).

The analysis apparatus 1 reads the contents of the executed event recorded beforehand in the event recording part 122 by the process execution of the acceptance part 106 under the control of the control mechanism 10 (at S113). The events in the operation S113 include the commercial events and campaigns such as the price discount, the premium sale and the advertisement carried out during the analysis period to generate the access history.

In the analysis apparatus 1, the composition ratio of the principal components for each class as the result of classification by the classification part 1011 is derived by the process executed by the second generating part 1013 under the control of the control mechanism 10 (at S114) thereby to generate the class composition ratio table indicating the correspondence between the class and the composition ratio of the principal components (at S115).

Further, in the analysis apparatus 1, an event classification table indicating the correspondence between the class and the contents of the event is generated by the process executed by the third generating part 1014 under the control of the control mechanism 10 (at S116). The class and the contents of the event in operation S116 are set in correspondence with each other based on a unit period such as a day. For example, the class obtained by the classification based on the contents of the access for the day constituting the base of correspondence is set in correspondence with the contents of the event on the particular day.

In the analysis apparatus 1, the latent trait principal component table, the event classification table and the class composition ratio table are recorded in the analysis result recording part 124 as an event feature model of the effect on the event execution by the process of the event feature model generating part 101 under the control of the control mechanism 10 (at S117). In this way, the analysis process is executed.

Figure 7:
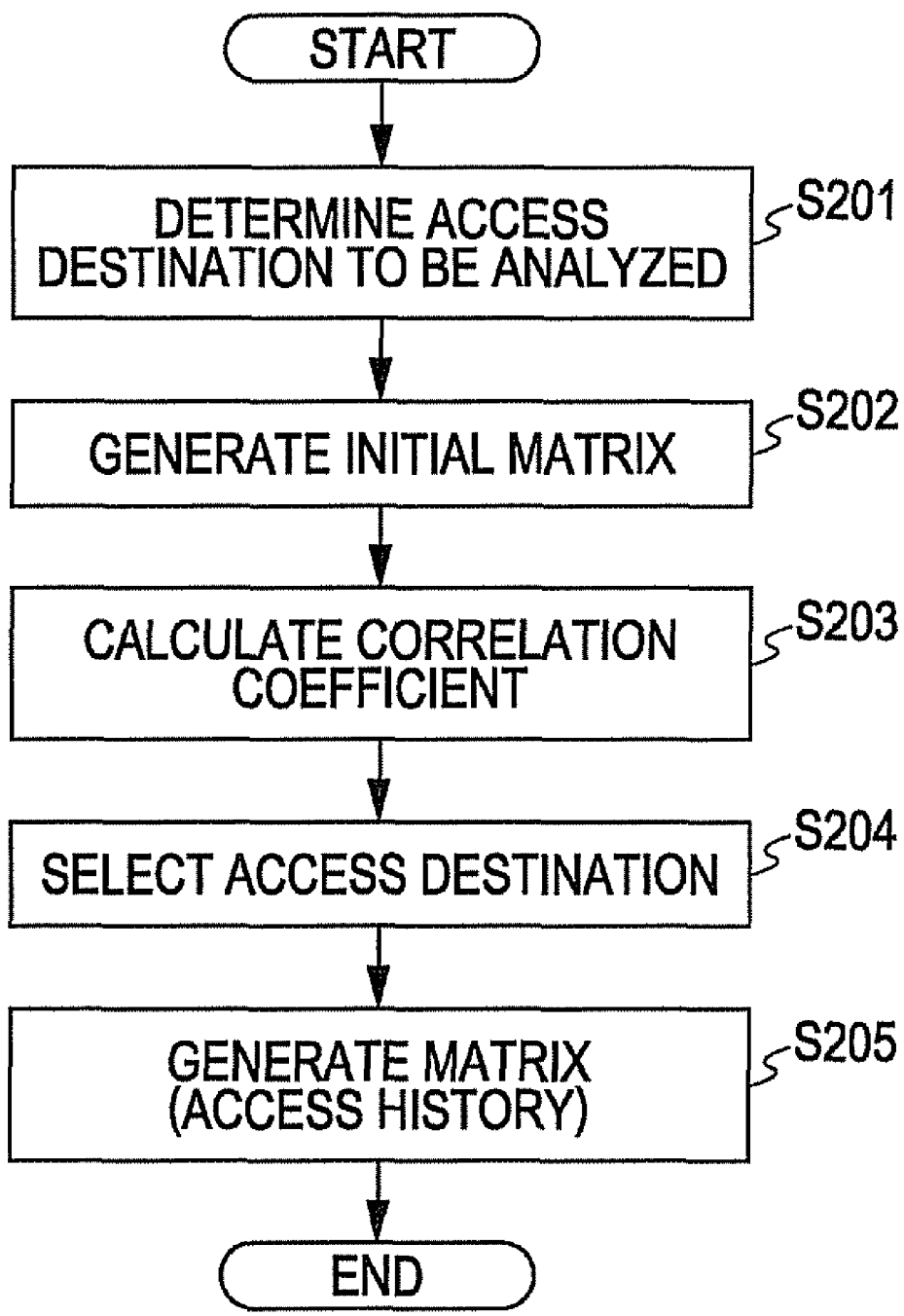
FIG. 7 is an operation chart depicting an example of an item mass setting process executed by the analysis apparatus according to an embodiment.

Next, each process included in the analysis process is further explained. FIG. 7 is an operation chart depicting an example of the item mass setting process executed by the analysis apparatus 1 according to the embodiment discussed herein. An explanation is given about the process executed by the item mass setting part 1000 for generating the access history in matrix explained above as a process of the operation S102 in the analysis process. In the analysis apparatus 1, the mass of the access destination to be analyzed is determined from the web log based on the frequency of access to the access destination per unit period during the intended period by the process executed by the item mass setting part 1000 under the control of the control mechanism 10 (at S201). The frequency of access per unit period during the intended period is defined as the count of the number of accesses made to the access destination each day during the intended period of, say, three months. The mass of the URLs of the access destinations high in access frequency or the top 30 access destinations in terms of the number of accesses is determined for each day. The logic sum of the mass of the access destinations per day thus determined is determined as a mass of the access destinations to be analyzed.

In the analysis apparatus 1, the initial matrix indicating whether each session has accessed each access destination determined in operation S201 is generated by the process executed by the item mass setting part 1000 under the control of the control mechanism 10 (at S202). The initial matrix generated in the operation S202 forms the foundation of the access history in matrix explained above with reference to FIG. 6 and generated in the same manner as depicted in FIG. 6.

In the analysis apparatus 1, the correlation coefficient on the access or non-access to each access destination and the target access destination indicated in the initial matrix is calculated by the process executed by the item mass setting part 1000 under the control of the control mechanism 10 (at S203). The correlation coefficient of Person, for example, is used as the correlation coefficient in operation S203.

In the analysis apparatus 1, the null hypothesis that the correlation on the access or non-access to each access destination or the target access destination indicated in the initial matrix is 0 may be discarded and the access destination with the correlation coefficient not negative may be selected by the process executed by the item mass setting part 1000 under the control of the control mechanism 10 (at S204).

In the analysis apparatus 1, the matrix indicating the access or non-access for each session to the selected access destination and the target access destination is generated by the process executed by the item mass setting part 1000 under the control of the control mechanism 10 (at S205). The matrix generated in operation S205 constitutes the access history in matrix.

Figure 8:
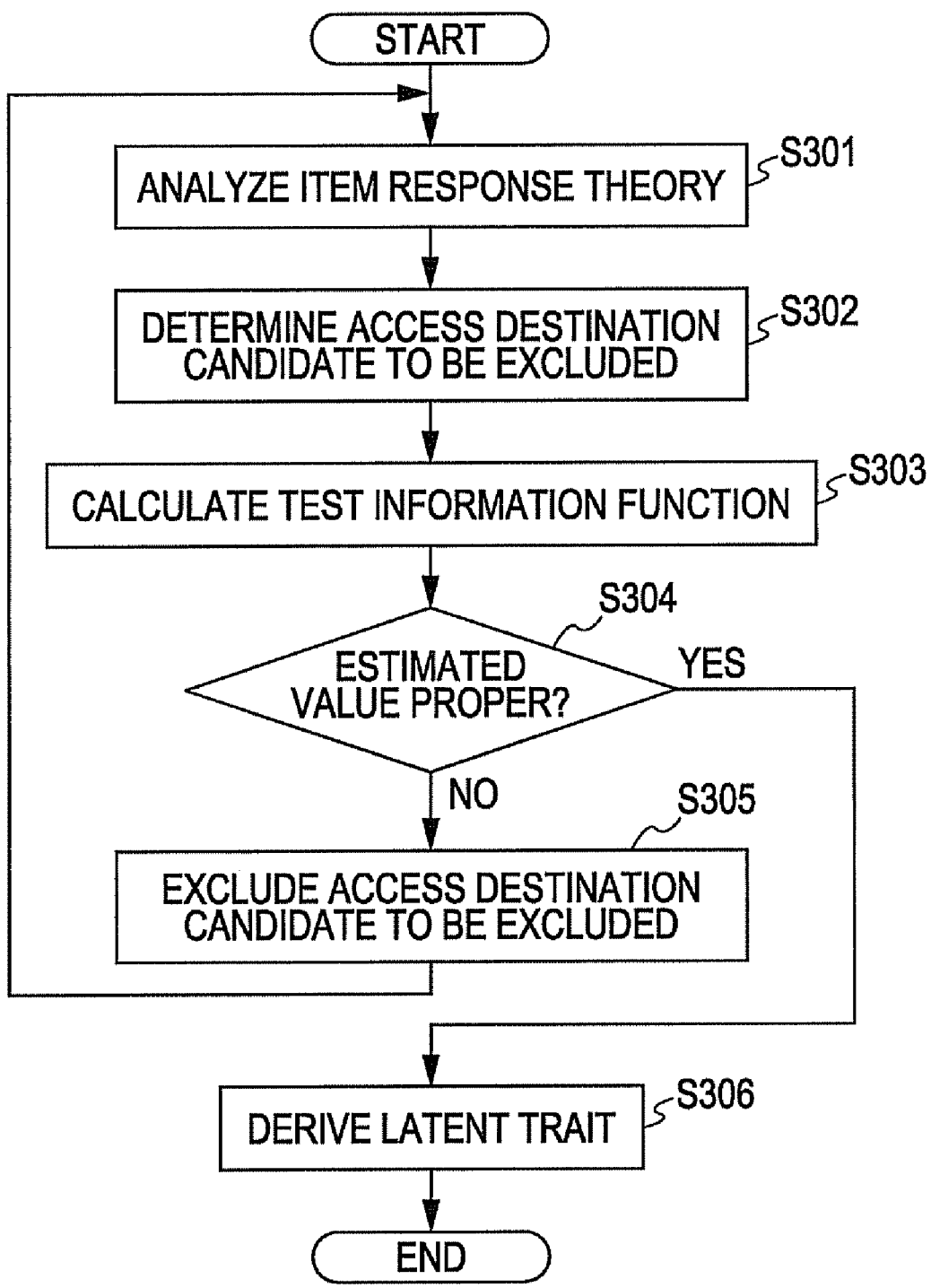
FIG. 8 is an operation chart depicting an example of an item response theory analysis process executed by the analysis apparatus according to an embodiment.

FIG. 8 is an operation chart depicting an example of the item response theory analysis process of the analysis apparatus 1 according to the embodiment discussed herein. An explanation is given about the process executed by the item response theory analysis part 1001 for deriving a parameter for the various estimated values such as the latent trait explained above as the process of operation S104 in the analysis process. The item response theory analysis process is defined as the process to derive the parameter on the estimated value such as the latent trait based on the item response theory from the access history in matrix. In the analysis apparatus 1, the item response theory analysis is conducted using the item response theory for the access history in matrix by the process executed by the item response theory analysis part 1001 under the control of the control mechanism 10 (at S301).

The item response theory analysis of operation S301 is explained. The item response theory is a mathematical model used for preparation and operation of, for example, TOEIC (registered trademark) widely used as an English test system, and described in the following references:

1. Toyoda, Hideki, Preface to "Item Response Theory (Introduction)", published by Asakura Books, 2002
2. Toyoda, Hideki, "Item Response Theory (Theory)", p. 27, published by Asakura Books, 2003

In the analysis apparatus 1 according to the embodiment discussed herein, the item response theory analysis is conducted so that the latent trait indicating the latent possibility of access to the target access destination is derived for each session from the pattern of access or non-access to each access destination. According to the item response theory, the degree of difficulty of each access is modeled in an S-shaped curve called the logistic curve for the latent trait. The logistic curve may be defined by the distribution function obtained by Equation (1).

$$p(\theta) = c + \frac{1-c}{1 + \exp\{-D \cdot a \cdot (\theta - b)\}} \qquad \text{Equation (1)}$$

In Equation (1), $\theta$ is the ability of the subject, or in the embodiment discussed herein, the latent trait of the subject, $p(\theta)$ the correct answer probability or in the embodiment discussed herein, the probability of accessing the target access destination, and a discrimination parameter indicating the degree to which the problem positively determines the degree of the ability, or in the embodiment discussed herein, the degree to which the latent trait is related to the access or non-access to the access destination. Incidentally, the discrimination parameter affects the gentleness of a logistic curve. Character b is a difficulty degree parameter to determine the difficulty of a problem. The difficulty degree parameter in the embodiment discussed herein, is substantially equal to the ease with which the users access the access destination. Character c is a guesswork parameter indicating the probability of correct answer with guesswork. In the embodiment discussed herein, the guesswork parameter is substantially equal to the probability of accessing the access destination by coincidence. Character D is a constant or 1.7 in this case.

Assume that the access or non-access to the access destination in each session i ("1" when accessed, "0" when not accessed) is expressed as $u_i = \{u_{i1}, u_{i2}, \ldots, u_{ij}, u_{in}\}$. Then, the probability that the pattern matrix U indicates the access or non-access to each access destination in N sessions is obtained by Equation (2) below.

$$f(u \mid \theta, a, b, c) = \prod_{i=1}^{N} f(ui \mid \theta i, a, b, c) \qquad \text{Equation (2)}$$

$$= \prod_{i=1}^{N} \prod_{j=1}^{n} f(uij \mid \theta i, aj, bj, cj)$$

The values of $\theta$, a, b and c maximizing the likelihood indicated in Equation (2) are estimated from the pattern matrix U indicating the access or non-access, i.e. the contents of the access history in matrix. For this estimation, the existing method such as the simultaneous maximum likelihood estimation method or the marginal maximum likelihood estimation method is used. For the analysis by the item response theory, on the other hand, the program module such as the Itm library as an existing library provided in the statistical analysis environment R described below may be used.

"The R Project for Statistical Computing", [online], [retrieved Mar. 19, 2008], internet <URL: http://www.r-project.org/index.html>

In the case where the parameter is estimated using the Itm function of the Itm library, according to the embodiment discussed herein, the guesswork parameter c is always assumed to be 0, and the model is used to estimate the discrimination parameter a and the difficulty degree parameter b.

In the analysis apparatus 1, the access destination including the exclusion candidate is determined by the process of the item response theory analysis part 1001 under the control of the control mechanism 10 based on the fitting accuracy of each parameter indicating the logistic curve estimated by the item response theory (at S302). The Itm function of the Itm library is output as a standard error and the estimated values of the parameters aj, bj to each access destination. With regard to the access destination with a large standard error, the correct answer probability p(θ) for the latent character θ fails to indicate the ideal S-shaped curve, indicating that the relation between the particular access destination and the latent trait θ is doubtful. In operation S302, the access destination for which the standard error including a substitute of the guesswork accuracy exceeds a preset threshold value such as 1 is determined as an exclusion candidate.

In the analysis apparatus 1, the test information function is calculated by the process executed by the item response theory analysis part 1001 under the control of the control mechanism 10 (at S303). The test information function is defined as the function indicating the degree to which an estimated value, if any, of the latent trait θ of a given session is different from the actual value. How to calculate the test information function is explained below.

Assuming that a given access destination is designated as $URL_j$, the latent trait $θ_i$ for the access destination $URL_j$ may be expressed by Equation (3) below.

$$I_j(θ_i) = D^2 · a_j^2 · p_j(θ_i) · q_j(θ_i) \quad \text{Equation (3)}$$

In Equation (3), $I_j(θ_i)$, $a_j$, $p_j(θ_i)$, $q_j(θ_i)$, D respectively express the item information amount for the access destination $URL_j$, the discrimination parameter calculated for the access destination $URL_j$, the value of the probability for accessing the access destination $URL_j$ as derived from the logistic curve by the user, the value indicating the probability of not accessing the access destination $URL_j$, and a constant, which is 1.7 in this case.

As indicated by Equation (4) below, the test information function is calculated as the sum of the item information amount $I_j(θ_i)$.

$$I(θ_i) = Σ I_j(θ_i) \quad \text{Equation (4)}$$

In Equation (4), $I(θ_i)$ is the test information function. Also, the value of the test information function $I(θ_i)$ for the estimated latent trait θ is the test information amount $I(θ)$. The inverse $1/\sqrt{I(θ)}$ of the square root of the test information amount $I(θ)$ is the standard error of the estimated latent trait θ.

In the case where the standard error of the estimated latent trait $θ_j$ for the access destination $URL_j$ is large, for example, it indicates that the estimation accuracy of the latent trait θ in the particular area is low.

After the item response theory analysis part 1001 under the control of the control mechanism 10, executes the process, the analysis apparatus 1 judges whether the estimated value of the parameter such as the latent trait θ by the item response theory analysis in operation S301 is proper or not (at S304). In the case where the access destination determined as an exclusion candidate exists and the standard error $1/\sqrt{I(θ)}$ calculated based on the test information function is not more than the given threshold value of, say, 0.5, the analysis apparatus 1 judges in operation S302 that the estimated value of the parameter such as the latent trait θ is not proper.

Upon judgment in operation S304 that the estimated value is not proper (NO at S304), the analysis apparatus 1 excludes the access destination determined as an exclusion candidate by the process of the item response theory analysis part 1001 under the control of the control mechanism 10 (at S305). The analysis apparatus 1 returns to operation S301 to repeat the subsequent process. In operation S305, the access destination having the largest standard error among the access destinations designated as exclusion candidates is excluded. Incidentally, plural access destinations satisfying the given condition may be excluded as required, or likewise, the apparatus can be appropriately designed. The analysis apparatus 1 reconstructs the access history in matrix except for the excluded address destinations and executes the process subsequent to the item response theory analysis.

In the case where operation S304 judges that the estimated value is proper (YES at S304), the analysis apparatus 1 derives the estimated value of the parameter such as θ based on the item response theory analysis in operation S301 as the latent trait constituting the analysis result of the process executed by the item response theory analysis part 1001 under the control of the control mechanism 10 (at S306).

The parameters for the various estimated values such as the latent trait derived in operation S306 is recorded in the access behavior model recording part 123 as the access behavior model in operation S105 of the analysis process. Now, the access behavior model recorded in the access behavior model recording part 123 is explained.

In operation S306, the latent trait is derived as a set "session ID, estimated θ value". The access behavior model recording part 123 records the latent trait table therein as an access behavior model. The latent trait table indicates the sets of the session ID and the latent trait θ in correspondence with each other. The access behavior model depicted in the latent trait table indicates the latent trait representing the latent possibility of the access to the target access destination of each session.

Figure 9:
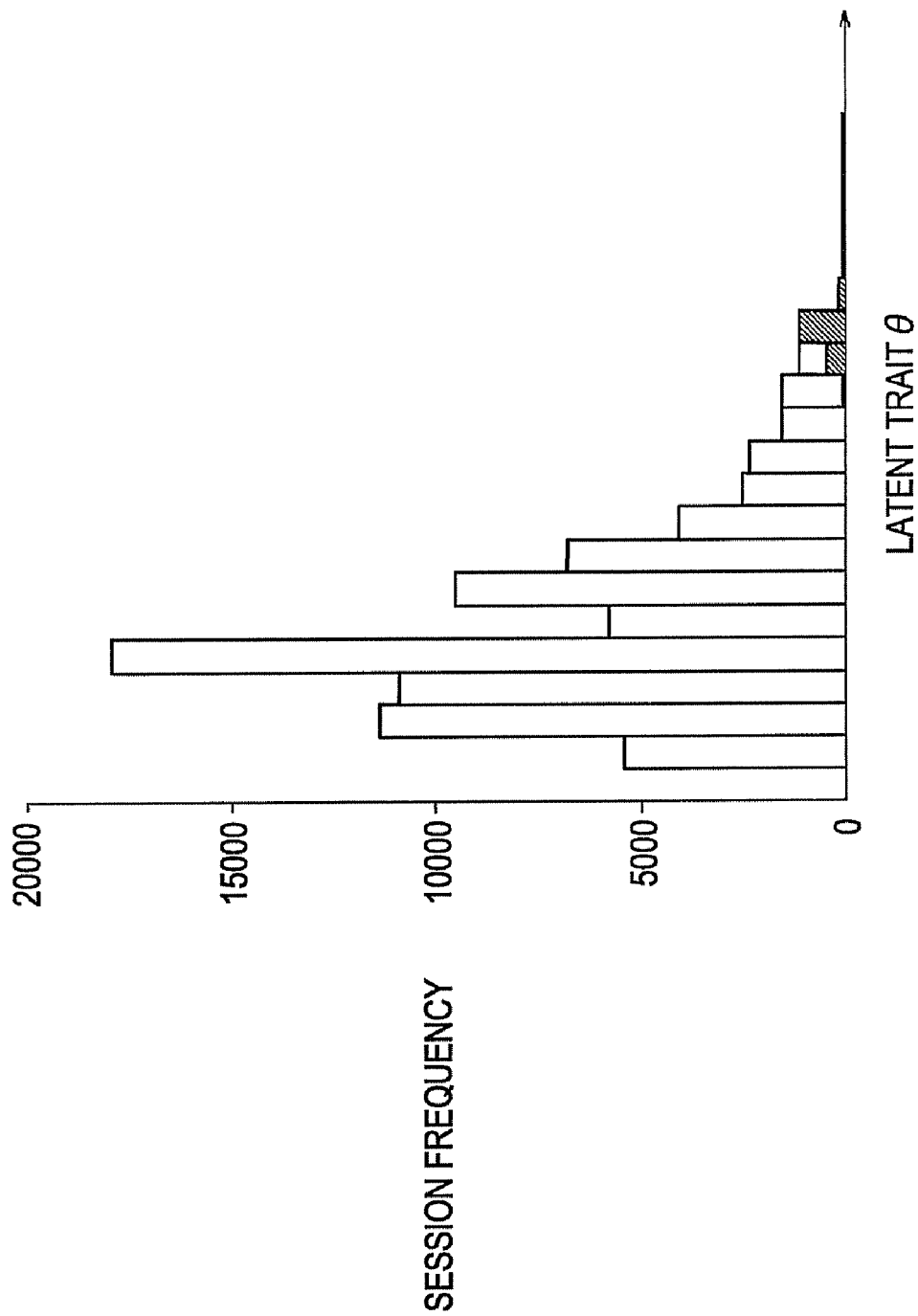
FIG. 9 is a histogram depicting an example of a distribution of latent traits derived by the analysis apparatus according to an embodiment.

FIG. 9 is a histogram depicting an example of the distribution of the latent traits derived by the analysis apparatus 1 according to the embodiment discussed herein. The histogram depicted in FIG. 9, in which the abscissa represents the latent trait θ and the ordinate the session frequency, indicates the relation between them. In the histogram, the session of the frequency as a hatched part indicates that the target access destination has been accessed. The histogram of FIG. 9 is a graph in which the contents of the latent trait table recorded in the access behavior model recording part 123 are developed and depicted as the frequency distribution for each latent trait. A part of the sessions with a high latent trait has actually reached the target access destination or, for example, has reached the commodity purchase. Also, with regard to the session not having reached the target access destination, the degree of the latent trait can be compared.

Also, in operation S306, the set "URL, difficulty degree, discrimination" is derived. The access behavior model recording part 123, therefore, records therein an access behavior model in the form of an estimated value table indicating the correspondence between the access destination, the estimated value of the difficulty degree parameter b and the estimated value of the discrimination parameter a as a set.

Figure 10:
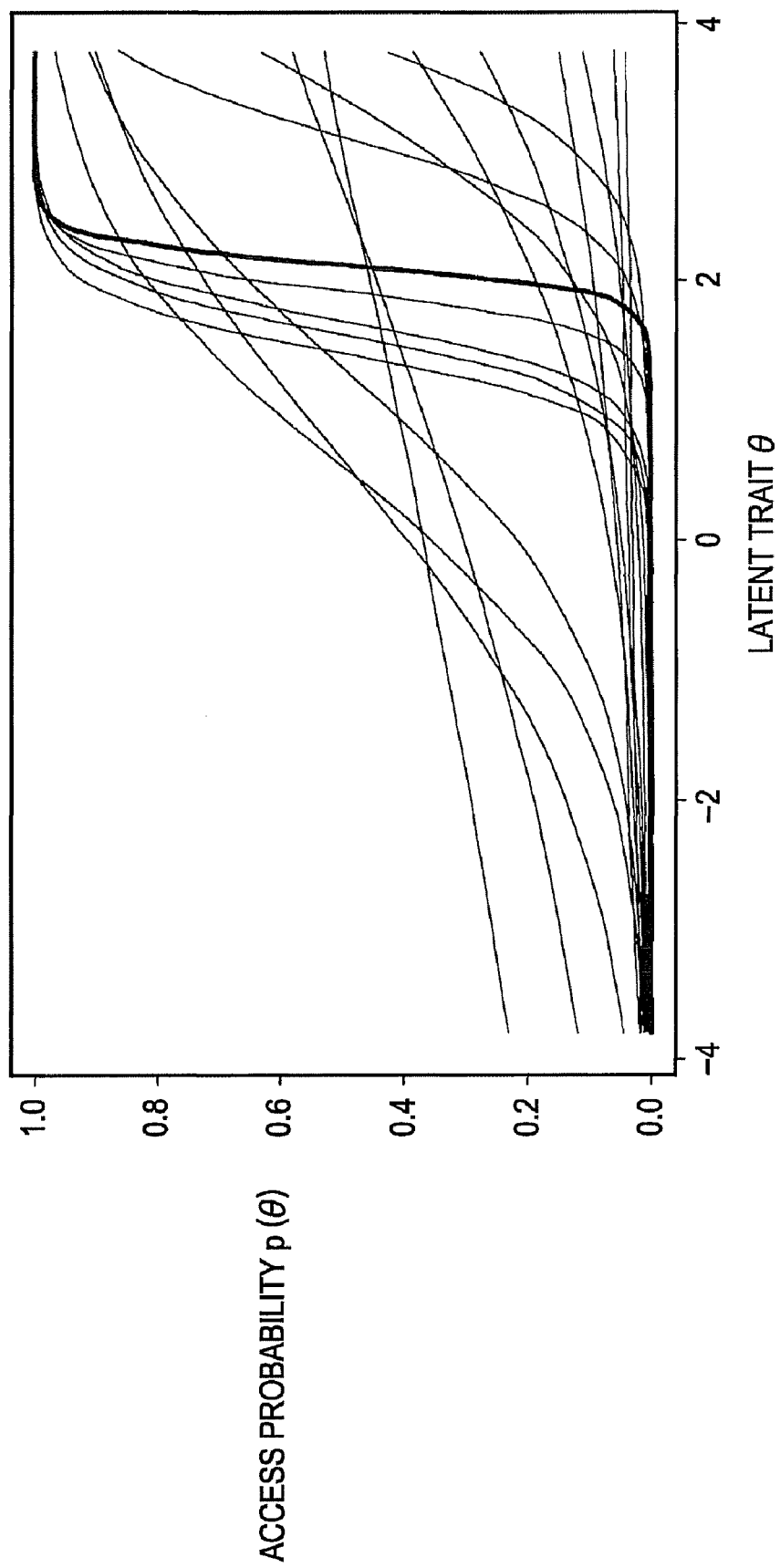
FIG. 10 is a graph depicting a logistics curve of an item response theory used by the analysis apparatus according to an embodiment.

FIG. 10 is a graph depicting the logistic curve of the item response theory used by the analysis apparatus 1 according to the embodiment discussed herein. The graph of FIG. 10, in which the abscissa represents the latent trait θ and the ordinate the access probability p(θ), depicts the logistic curve using the estimated value for each set in the estimated value table. In the estimated value table, the estimated value of the difficulty degree parameter b and the estimated value of the discrimination parameter a are set corresponding to the access destination, and therefore, each logistic curve corresponds to the access destination. Incidentally, in FIG. 10, the logistic curve depicted in thick line corresponds to the target access destination. By referring to FIG. 10, for example, a particular access destination accessed by the user having a high latent trait, for example, may be read.

Further, in operation S306, the set "vector of n 0s or 1s, latent trait estimated value" is derived and recorded as an access behavior model. The character n designates the number of the access destinations to be analyzed. This access behavior model indicates the user behavior with each access pattern as vector of 0 or 1. This access behavior model also indicates that the same latent trait is estimated for the sessions of the same access pattern.

Next, an explanation is given about the process executed by the event feature model generating part 101 for generating the various event feature models explained above as the process of operations S106 to S115 in the analysis process.

In the analysis apparatus 1, the principal components analysis part 1010 of the event feature model generating part 101 executes the process of operations S106 to S108 of the analysis process. FIG. 11 is a three-dimensional graph depicting an example of the frequency distribution table. The frequency distribution table indicates the number of accesses per unit period and per latent trait derived by the analysis apparatus 1 according to the embodiment discussed herein. FIG. 11 is a frequency distribution table in the form of a graph depicting the frequency distribution derived in operation S106. In FIG. 11, the number of accesses is depicted per unit period and per latent trait. In the case under consideration, the day is used as the unit period.

Figure 12A:
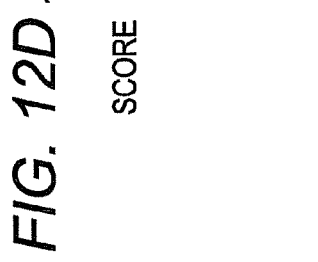
FIGS. 12A to 12F are graphs depicting examples of a principal component base and a principal component score constituting a result of a principal components analysis by the analysis apparatus according to an embodiment.
Figure 12D:
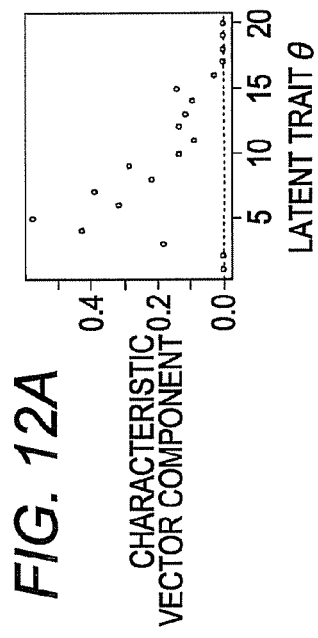
Figure 12B:
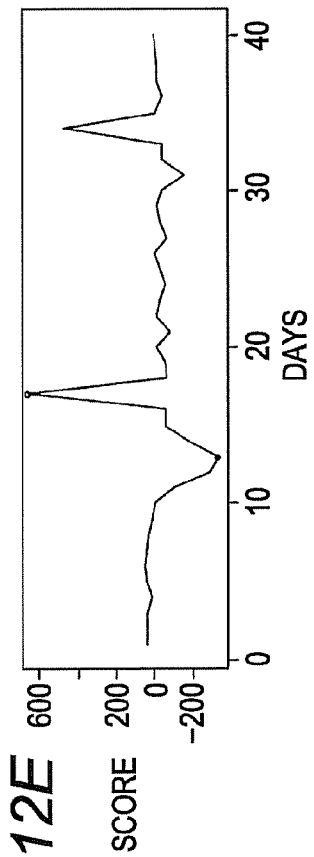
Figure 12E:
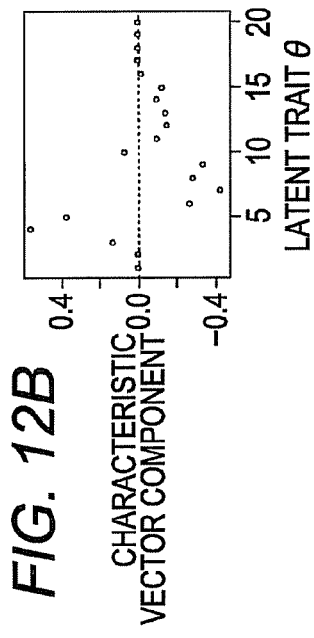
Figure 12C:
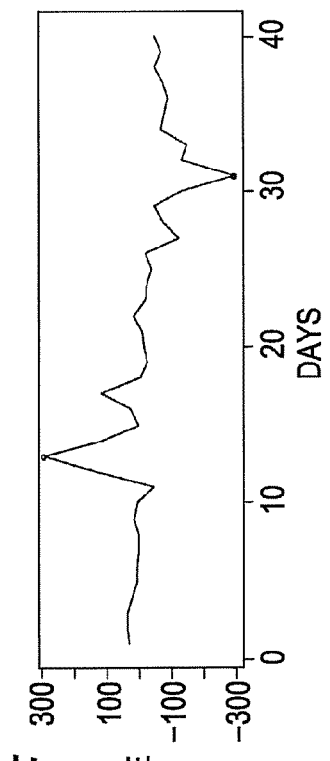
Figure 12F:
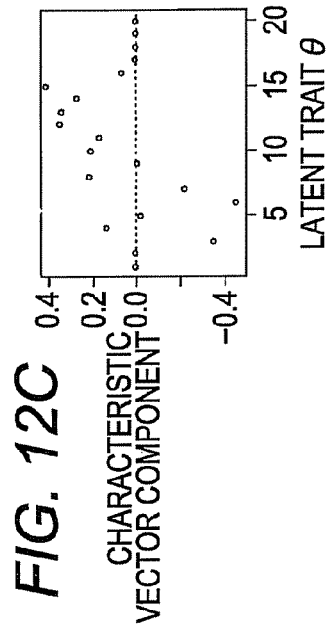

FIGS. 12A to 12F are graphs depicting an example of the principal component base and the principal component score of the principal components providing the result of analysis of the principal components by the analysis apparatus 1 according to the embodiment discussed herein. FIGS. 12A to 12F depict the result of analyzing the principal components in the operation S107. The principal components analysis part 1010 executes the analysis of the principal components as one of the multivariate analysis techniques on the frequency distribution indicating the number of accesses per latent trait and per day. The principal components analysis part 1010 thus extracts the principal components forming the frequency distribution depicted in FIG. 11. FIG. 12A is a graph depicting the base of the first principal component having the highest contribution rate, which indicates the relation between the latent trait $\theta$ plotted along the abscissa and the component of the unique vector making up the first principal component plotted along the ordinate. FIG. 12B, on the other hand, is a graph that represents the secular variation of the score of the first principal component and the relation between the date plotted along the abscissa and the score of the first principal component plotted along the ordinate. FIG. 12C is a graph depicting the base of the second principal component having the second highest contribution rate. FIG. 12D is a graph depicting the secular variation of the score of the second principal component. FIG. 12E is a graph depicting the base of the third principal component having the third highest contribution rate, and FIG. 12F a graph depicting the secular variation of the score of the third principal component.

Figure 13:
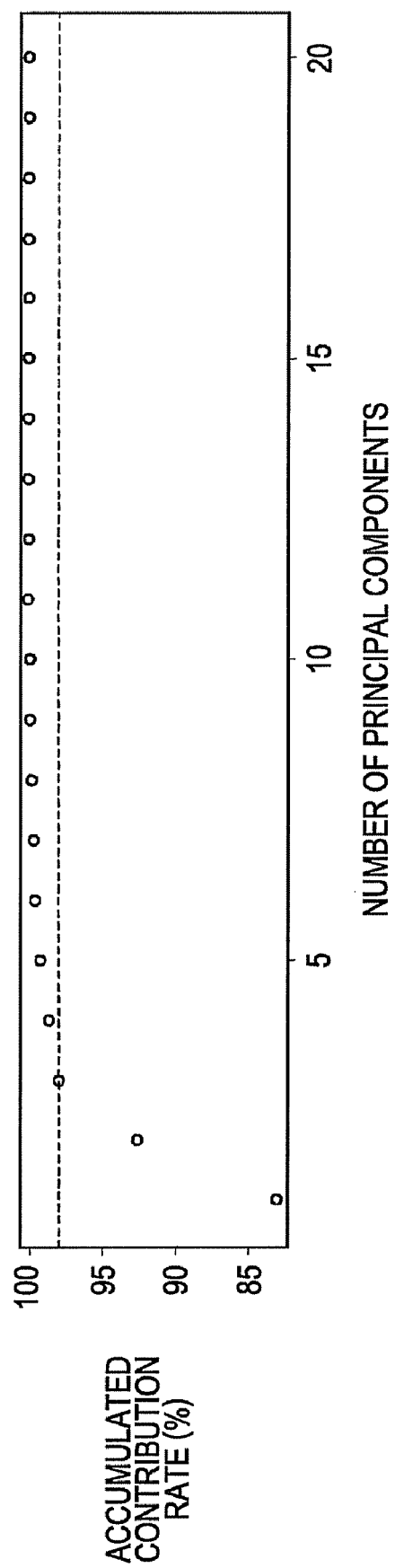
FIG. 13 is a graph depicting an example of an accumulated contribution rate of the principal components used for principal component selection by the analysis apparatus according to an embodiment.

FIG. 13 is a graph depicting an example of the accumulated contribution rate of the principal components used for selection of the principal components by the analysis apparatus 1 according to the embodiment discussed herein. FIG. 13 is a graph used for selection of the principal components in operation S108. In FIG. 13, the abscissa represents, in the descending order of the contribution rate, the principal components extracted by the analysis of the 20 principal components, and the ordinate represents the accumulated contribution rate of the principal components in the descending order. In the case where the selection of at least three principal components having the accumulated contribution rate of not less than 70% is set as the condition for selection of the principal components, the principal components having the top three high contribution rate are selected in the case of FIG. 13. In the example of FIG. 13, the accumulated contribution rate of the top three principal components thus selected amounts to not less than 96%. The top three principal components selected based on the contribution rate are the first, second and third principal components depicted in FIG. 12.

In the analysis apparatus 1, the first generating part 1012 of the event feature model generating part 101 executes the process of operations S109 to S110 of the analysis process. FIG. 14 is a diagram depicting an example of the latent trait principal component table generated by the analysis apparatus 1 according to the embodiment discussed herein. FIG. 14 depicts the latent trait principal component table generated in the operation S110. In the latent trait principal component table of FIG. 14, the content of the latent traits $\theta 1$ to $\theta 20$ making up the base of the high-order principal components selected, i.e. the first, second and third principal components is depicted in table form. The latent trait principal component table of FIG. 14 is a development in table form of the distribution of the latent traits making up the base of each principal component depicted in FIG. 12. Incidentally, the latent trait principal component table is recorded in the analysis result recording part 124 as an event feature model.

Figure 15:
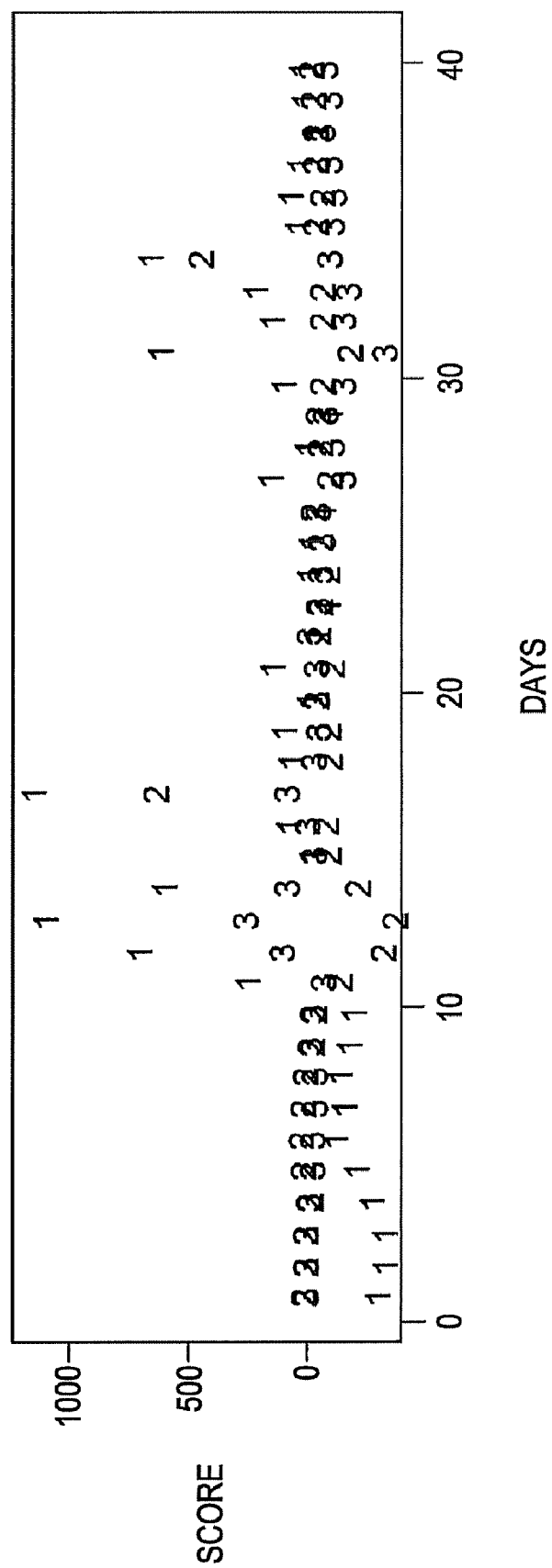
FIG. 15 is a graph depicting an example of a secular variation of the principal components in the analysis apparatus according to an embodiment.

In the analysis apparatus 1, the classification part 1011 of the event feature model generating part 101 executes the operations S111 to S112 of the analysis process. FIG. 15 is a graph depicting an example of the secular variation of the principal components in the analysis apparatus 1 according to the embodiment discussed herein. FIG. 15 is a graph showing the secular variation of the score of the first, second and third principal components, and represents the relation between the date plotted along the abscissa and the score of each principal component plotted along the ordinate. The numerals 1, 2 and 3 in the graph designate the first, second and third principal components, respectively.

Figure 16A:
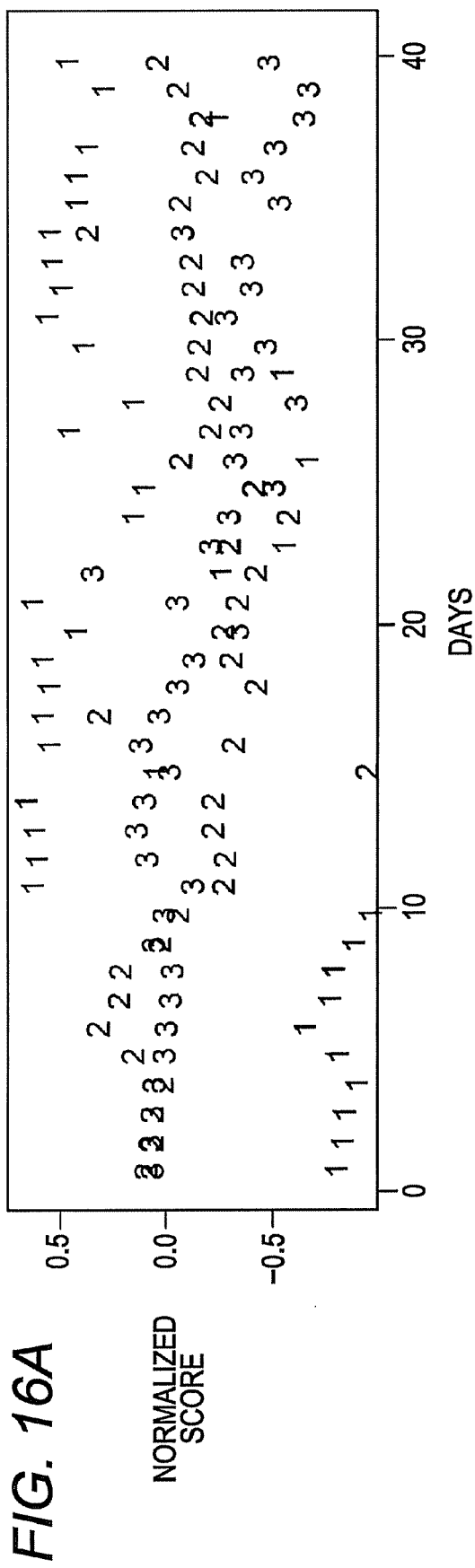
FIGS. 16A and 16B are graphs depicting examples of the secular variation of the principal components normalized in the analysis apparatus according to an embodiment.
Figure 16B:
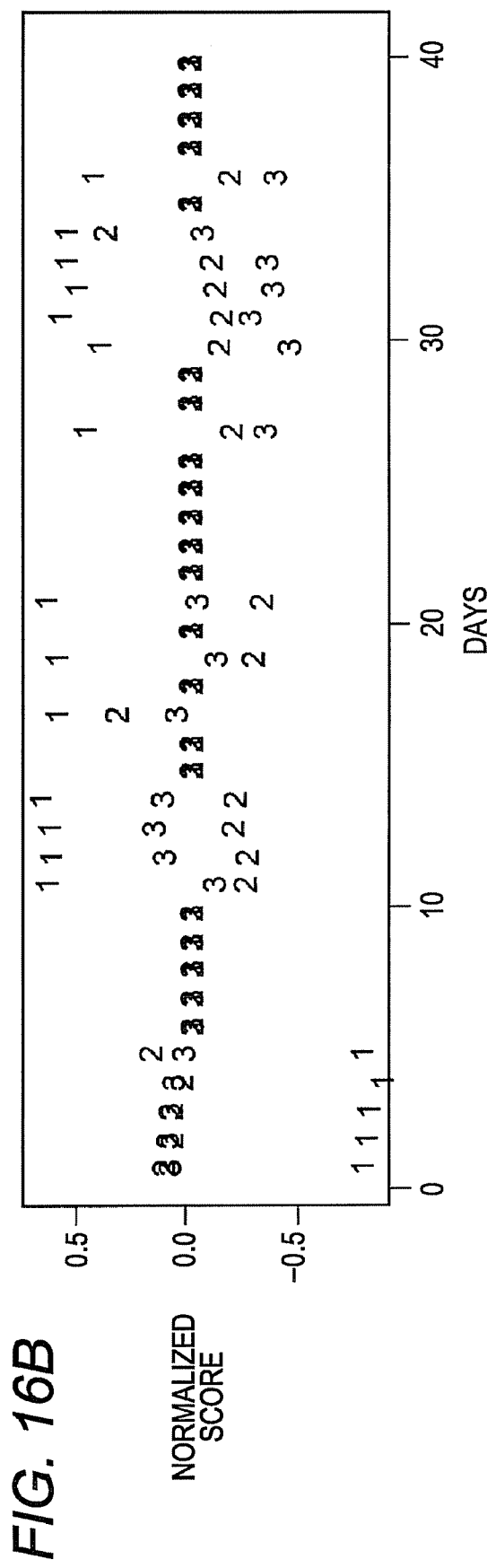

FIG. 16 is a graph depicting an example of the secular variation of the normalized principal components in the analysis apparatus 1 according to the embodiment discussed herein. FIGS. 16A and 16B are graphs indicating the normalization executed in operation S111. FIG. 16A depicts the normalized secular variation of the score of the first, second and third principal components depicted in FIG. 15, in which the ordinate represents the normalized score of the first, second and third principal components. The score is normalized for the set of the scores by day. For the score normalization by day, the sum of the absolute values of the scores of the principal components is calculated as a size coefficient, by which the score of each principal component is divided. Thus, the sum of the absolute values of the normalized principal components is unity.

In the analysis of the principal components, the score of each principal component is assumed the value of substantially zero for the day on which the distribution of the latent trait $\theta$ is average. Once the score of each principal component approaches zero, the score difference between the principal components is reduced, and therefore, may have an adverse effect on the clustering. In the case where the size coefficient constituting the sum of the absolute values of the score of the principal components is assumed a value approximate to zero, therefore, the corrective operation is performed to reduce the normalized score constituting the result of division to zero. FIG. 16B depicts a case in which the secular variation of the normalized score depicted in FIG. 16A is arithmetically corrected so that the score of each principal component for day when the size coefficient is assumed a value approximate to zero is reduced to zero. A result of comparison between FIGS. 16A and 16B apparently indicates that the normalized score of all the principal components is zero as depicted in FIG. 16B for the day when the variation of the normalized score of the principal components depicted in FIG. 16A is small. In the example depicted in FIGS. 16A and 16B, the date at which the size coefficient is reduced to not more than 10% against the maximum value of the size coefficient during the analysis period is set as a condition to judge that the size coefficient is substantially zero.

Figure 17:
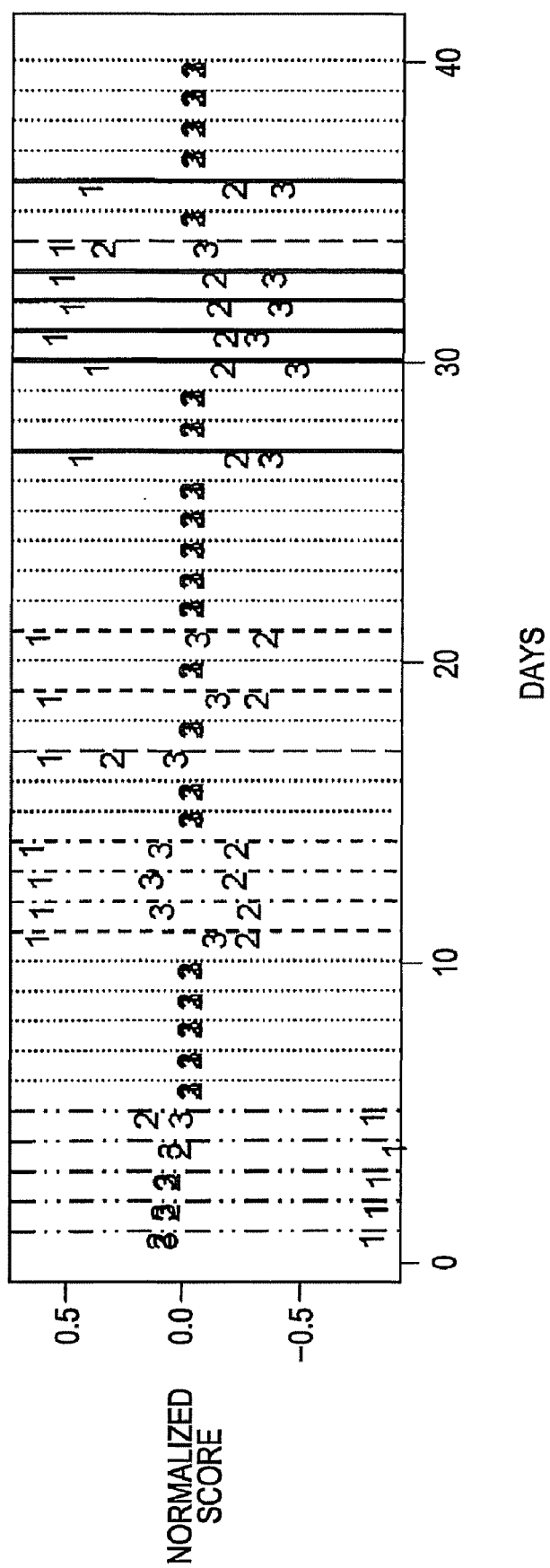
FIG. 17 is a graph depicting an example of a result of a classification by the analysis apparatus according to an embodiment.

FIG. 17 depicts an example of the result of classification in the analysis apparatus 1 according to the embodiment discussed herein, and FIG. 18 a diagram for explaining an example of the result of classification in the analysis apparatus 1 according to the embodiment discussed herein. FIG. 17 is a graph depicting the classification (clustering) carried out in the operation S112. FIG. 17 depicts the normalized score of each principal component of FIG. 16B classified by day, and the days of the same line type are classified into the same class. Also, FIG. 18 is a diagram depicting the development of the graph depicted in FIG. 17. In FIG. 18, the class type, the size coefficient and the normalized score of each principal component are depicted for each analysis date. The class type is defined as the name of the class as the result of classification. The analysis apparatus 1 classifies the relation of the normalized score of the principal components by day using the technique such as the k-means clustering. The k-means clustering is a representative clustering method of non-hierarchical type.

The k-means clustering method is explained. First, the minimum value of the normalized score of each principal component is set as 0 and the maximum value thereof as 1. Then, the section between the minimum value and the maximum value is segmented into a given number of sections. In the case under consideration, the section between the minimum value and the maximum value is segmented into five sections including [0.0 to 0.1], [0.1 to 0.4], [0.4 to 0.6], [0.6 to 0.9], [0.9 to 1.0]. Incidentally, the value defining the section indicates the relative position in the section between the minimum value and the maximum value. Then, the judgment is made as to which section is associated with the relative position of the normalized score of each principal component. Specifically, the principal components are divided into five levels according to the relative position. The relative position of the score is calculated by dividing the result of subtracting the minimum value from the score by the difference between the maximum and minimum values. The set of the sections associated with the relative position of the principal components is determined each day, and the dates in the same set are classified as a class. For example, in the case where the section associated with the first principal component determined for the day A is [0.0 to 0.1], the section associated with the second principal component [0.0 to 0.1], the section associated with the third principal component [0.4 to 0.6] and this is also the case with each set associated with each principal component determined for the day B, then the day A and the day B are classified into the same class. In the example depicted in FIGS. 17 and 18, 2007/3/1 and 2007/3/2 can be confirmed as classified into the same class indicated as "type 1".

In the analysis apparatus 1, the second generating part 1013 of the event feature model generating part 101 executes the operations S114 to S115 of the analysis process. FIG. 19 is a diagram depicting an example of the class construction ratio table generated by the analysis apparatus 1 according to the embodiment discussed herein. FIG. 19 depicts an example of the class construction ratio table generated by the operation S115. In the class construction ratio table depicted in FIG. 19, the construction ratio of each principal component is indicated in table form for each class. The values indicated as the construction ratio of each principal component is obtained by calculating the average value of the relative values of the principal components as a representative value of each principal component. Incidentally, the class construction ratio table is recorded in the analysis result recording part 124 as an event feature model.

In the analysis apparatus 1, the third generating part 1014 of the event feature model generating part 101 executes the operation S116 of the analysis process. FIG. 20 is a diagram depicting an example of the event classification table generated by the analysis apparatus 1 according to the embodiment discussed herein. FIG. 20 depicts the event classification table generated in operation S116. The event classification table depicted in FIG. 20 describes, in correspondence with each other by day, the contents of the event recorded in the event recording part 122 and the class type and size coefficient derived by the classification part 1011. The contents of the event include the event type and the event size with the elapsed number of days. The event classification table is recorded in the analysis result recording part 124 as an event feature model.

In this way, the analysis apparatus 1 executes the analysis process, generates the event feature model as the effect on the event execution and records the generated event feature model in the analysis result recording part 124.

Figure 21:
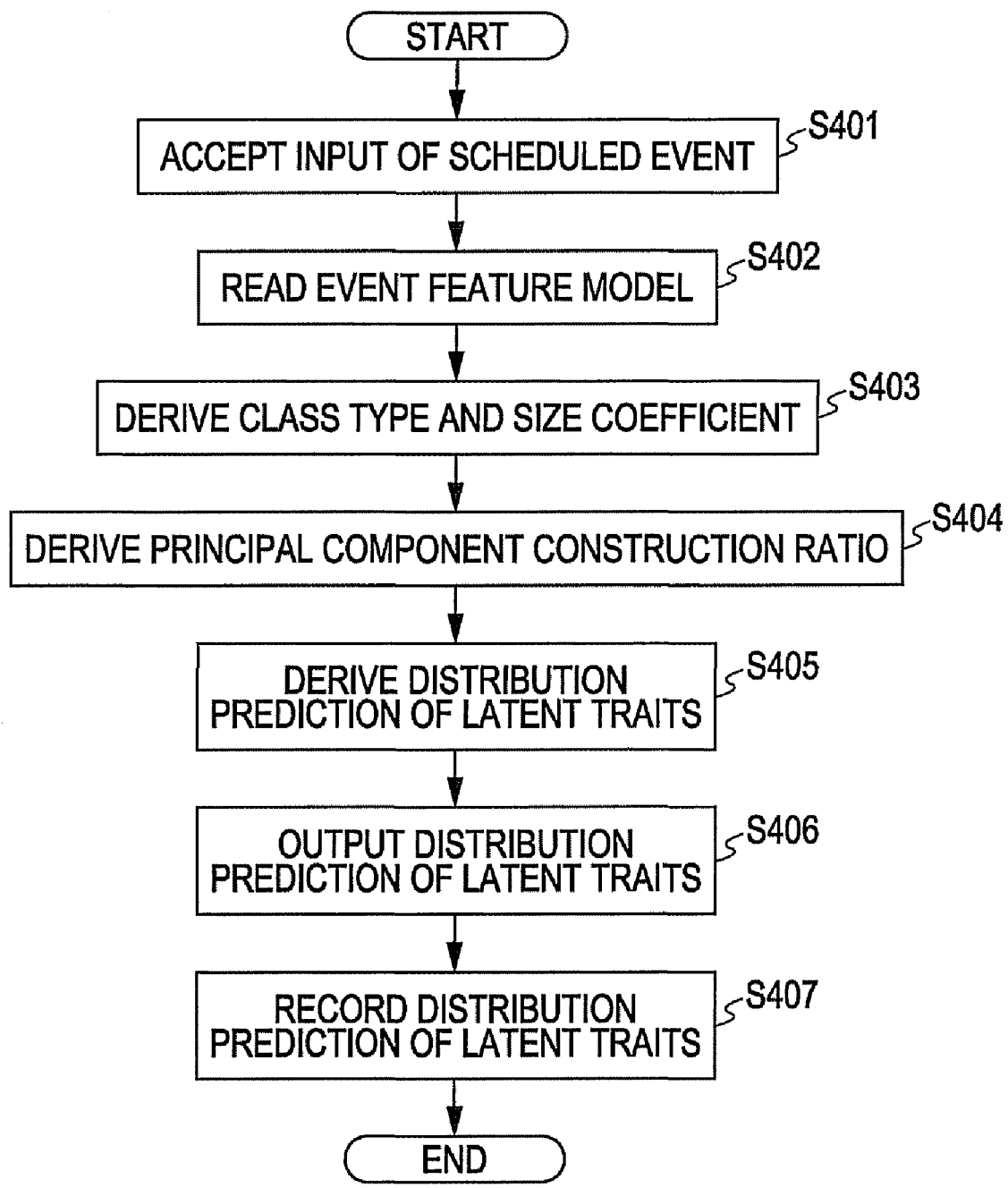
FIG. 21 is an operation chart depicting an example of a prediction process executed by the analysis apparatus according to an embodiment.
Figure 23A:
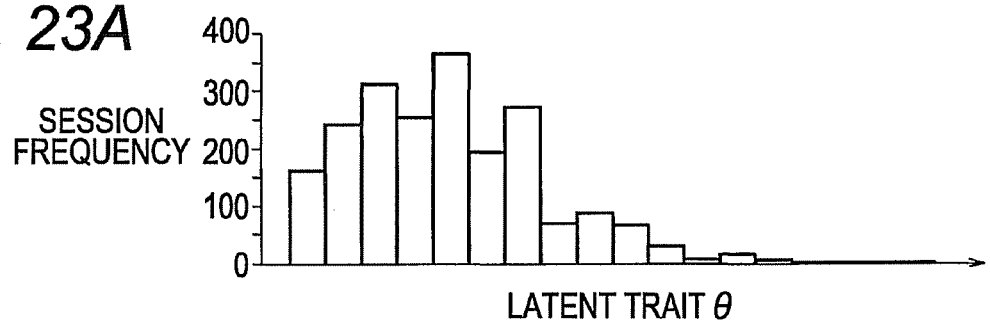
FIGS. 23A to 23D are diagrams for explaining examples of the predicted distribution of the latent traits output by the analysis apparatus according to an embodiment.
Figure 23B:
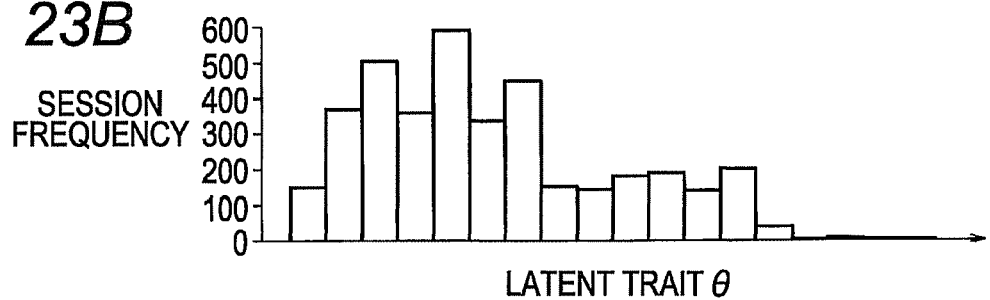
Figure 23C:
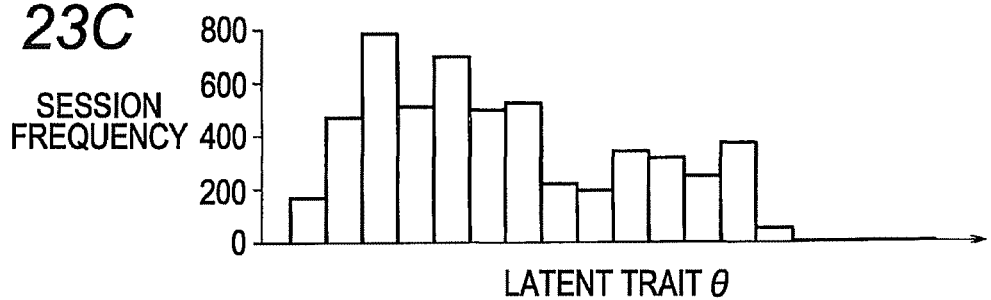
Figure 23D:
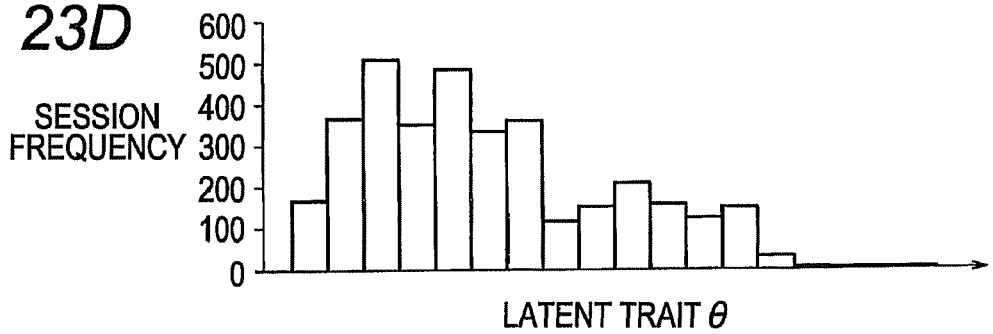

Next, an explanation is given about the prediction process using an event feature model as the result of the analysis process. The prediction process is such that in the case where the sales promotion campaign is carried out using an event feature model, the effect thereof, i.e. the access situation is predicted. FIG. 21 is an operation chart depicting an example of the prediction process executed by the analysis apparatus 1 according to the embodiment discussed herein. In the analysis apparatus 1, the input of the contents of the scheduled event to be executed is accepted (at S401) by the process of the acceptance part 106 under the control of the control mechanism 10 for carrying out the program such as the analysis program PRG. The contents of the scheduled event accepted in operation S401 are assumed, for example, the form substantially corresponding to the contents of the event recorded in the event recording part 122 depicted in FIG. 4.

In the analysis apparatus 1, the event feature model recorded in the analysis result recording part 124 is read by the process of the latent trait prediction part 102 under the control of the control mechanism 10 (at S402).

In the analysis part 1, the size coefficient and the class type predicted from the contents of the scheduled event are derived based on the event classification table, which is one of the event feature models, by the process of the latent trait prediction part 102 under the control of the control mechanism 10 (at S403). The operation S403 is the process of retrieving the elapsed number of days and the event content coincident with or analogous to the contents of the scheduled event and reading the class type and the size coefficient recorded in correspondence with the retrieved event content and the elapsed number of days. In the case where plural elapsed number of days and event contents coincident with or analogous to the contents of the scheduled event are existent, the average value of the plural size coefficients and the plural class types set in correspondence with each other are used. The average value of the class types is defined as the average value of the class construction ratio indicated in the class construction ratio table obtained by deriving the principal component construction ratio as the next process. Incidentally, instead of calculating the average value, the latest class type and the size coefficient may be used. This action is taken on the assumption that the event execution effect is a constantly changed.

FIG. 22 is a diagram depicting an example of the prediction process in progress in the analysis apparatus 1 according to the embodiment discussed herein. FIG. 22 depicts a specific example of the process of operation S403. FIG. 22 includes the number of elapsed days, the class type and the size coefficient which are depicted in correspondence with each other. The case depicted in FIG. 22 indicates that the class type is "type 1" for all the days on which the scheduled event is carried out, but the size coefficient thereof is changing each elapsed day.

The continuation of the operation chart depicted in FIG. 21 is explained. In the analysis apparatus 1, the principal component construction ratio predicted from the predicted class type is derived based on the class construction ratio table, one of the event feature models, by the process of the latent trait prediction part 102 under the control of the control mechanism 10 (at S404). The operation S404 is the process of retrieving the class type predicted in the operation S403 and reading the construction ratio of the principal components recorded in correspondence with the retrieved class type. From the class type "class type 1", for example, the content to the effect that the construction ratio of the first, second and third principal components is 0.7:0.1:–0.2 is read.

In the analysis apparatus 1, the distribution prediction of the latent traits is derived from the predicted principal component construction ratio based on the latent trait principal component table, one of the event feature models, by the process of the latent trait prediction part 102 under the control of the control mechanism 10 (at S405). The operation S405 is the process of deriving the predicted distribution of the principal components in such a way that the construction ratio of the principal components predicted in the operation S404 is multiplied by the distribution of the latent traits of the principal components recorded in the latent trait principal component table. Incidentally, in the process before the distribution prediction of the latent traits, the information read from the event feature model may not be used as they are, but may be appropriately corrected as required by adding the information, the experiences, etc. acquired independently by the sponsor.

In the analysis apparatus 1, the predicted distribution of the latent traits, the class type and the size coefficient, upon execution of the scheduled event, are output from the output mechanism 15 (at S406) while at the same time being recorded in the predicted latent trait distribution part 125 (at S407) by the process of the latent trait prediction part 102 under the control of the control mechanism 10. In the operation S406, the distribution prediction of the latent traits derived in the operation S405 is displayed on the monitor and printed out on the printer as required. In operation S407, the information indicating the distribution of the latent traits is recorded as the very distribution of the predicted latent traits, together with the information indicating the class type and the size coefficient as a model of the distribution of the latent traits.

FIGS. 23A to 23D are diagrams for explaining an example of the distribution prediction of the latent traits output by the analysis apparatus 1 according to the embodiment discussed herein. FIGS. 23A to 23D depict the result of the distribution prediction of the latent traits derived in operation S405, which is the information output in operation D406 and recorded in operation S407. FIGS. 23A to 23D are histograms indicating the distribution prediction of the latent traits from the first to fourth days of the scheduled event, in which the abscissa represents the latent trait and the ordinate the session frequency. Specifically, FIGS. 23A to 23D depict the prediction result using the form of the histogram indicating the distribution of the latent traits depicted in FIG. 9. In this way, the prediction process is executed.

Figure 24:
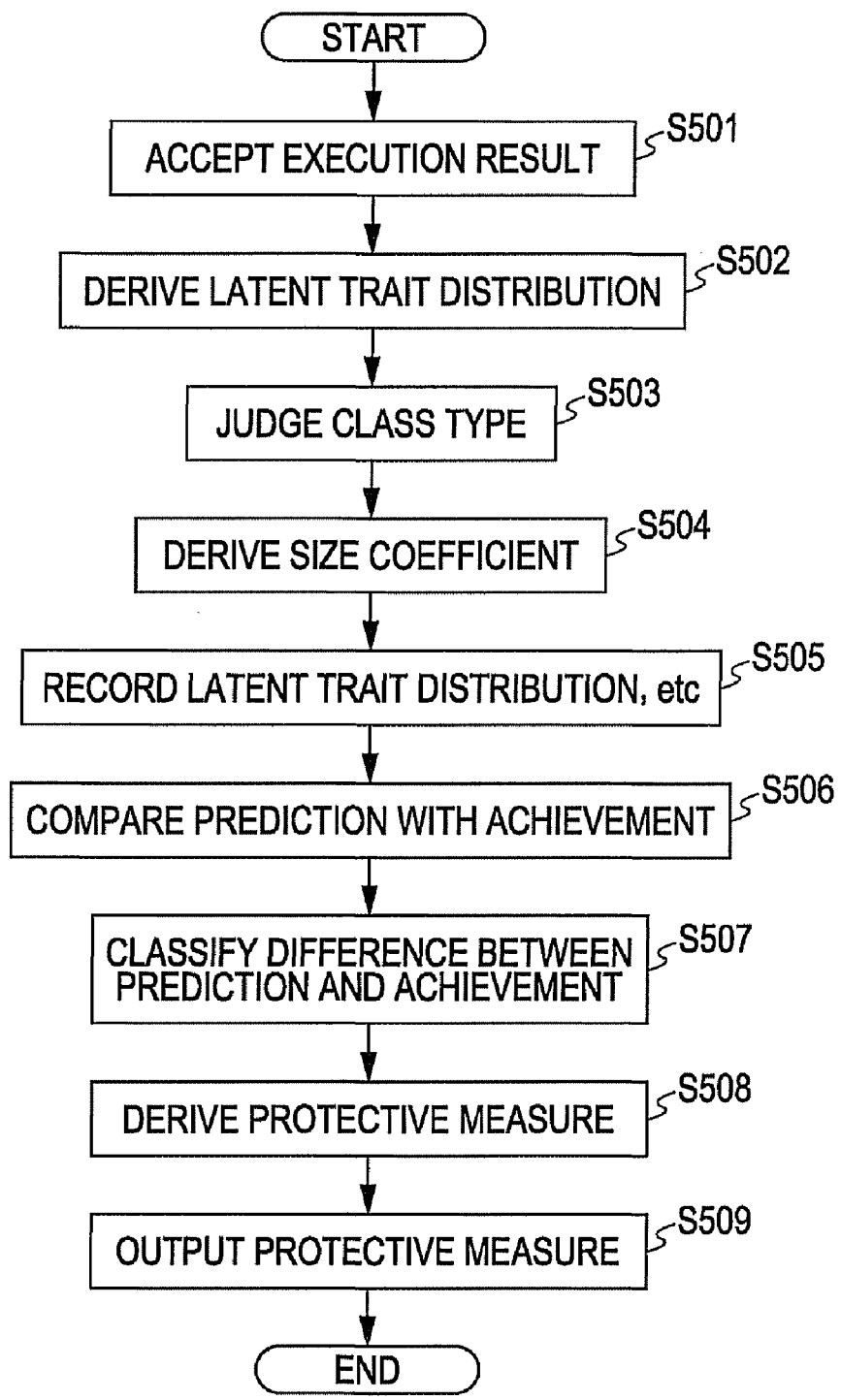
FIG. 24 is an operation chart depicting an example of a verification process executed by the analysis apparatus according to an embodiment.

Next, an explanation is given about the verification process for comparing the contents predicted in the prediction process with the result of a scheduled event that may be executed. FIG. 24 is an operation chart depicting an example of the verification process in the analysis apparatus 1 according to the embodiment discussed herein. In the analysis apparatus 1 according to the embodiment discussed herein, the execution result to be analyzed is read and accepted as an object to be processed from the execution result recording part 126 by the process of the acceptance part 106 executed under the control of the control mechanism 10 executing the analysis program PRG or other programs (at S501). The execution result accepted by the operation S501 is, for example, the access or non-access to the access destination and the target access destination after execution of the scheduled event as a diagram depicted for each session, i.e. in the same format as the Web log depicted in FIG. 3. In the case under consideration, the subsequent process is explained on the assumption that the execution result for one day is accepted after execution of the schedule event as an object to be analyzed.

In the analysis apparatus 1, the frequency distribution of the latent traits in the execution result is derived by the process of the execution result analysis part 103 under the control of the control mechanism 10 based on the accepted execution result and the access behavior model recorded in the access behavior model recording part 123 (at S502). The operation S502 is the process for estimating the latent trait and deriving the frequency distribution of the latent traits for each session from the result of access to the access destination and the target access destination in each session based on the past analysis result such as the access behavior model.

In the analysis apparatus 1, the regression analysis is carried out on the frequency distribution of the latent traits in the execution result by the process of the execution result analysis part 103 under the control of the control mechanism 10, so that the frequency distribution of the latent traits is decomposed into the weight for each principal component thereby to judge the class type (at S503). In the operation S503, first referring to the event feature models recorded in the analysis result recording part 124, the regression analysis is conducted with the principal component base of each principal component indicated in the latent trait principal component table as the explanatory variable thereby to determine the weight factor for each principal component. The weight factor thus determined is used to judge the class type. In the presence of the class type for which the weight factor is coincident with or approximate to the construction ratio of the principal components indicated in the class type construction ratio table of the event feature models, the particular class type can be judged as the one indicating the event execution result. For judgment of the class type, the R square value generally used as an index for evaluating the accuracy of the regression analysis can be used. In the case where the R square value exceeds 0.8 set as a threshold value, for example, the distribution of the latent traits can be judged to have been decomposed into the principal components of the class type used for the prediction.

In the analysis apparatus 1, the weight factor for the principal components determined by the regression analysis is normalized and the size coefficient derived by the process of the execution result analysis part 103 under the control of the control mechanism 10 (at S504).

In the analysis apparatus 1, the information indicating the execution result such as the distribution of the latent traits is recorded in the achieved latent trait distribution recording part 127 by the process of the execution result analysis part 103 under the control of the control mechanism 10 (at S505).

In the operation S505, the information indicating the very distribution of the latent traits is recorded together with the information indicating the class type and the size coefficient as the information on a model of the distribution of the latent traits.

In the analysis apparatus 1, the prediction and the achievement of the distribution of the latent traits are compared with each other by the process of the prediction-achievement comparison part 104 under the control of the control mechanism 10 (at S506). The operation S506 is the process to read the distribution of the predicted latent traits from the predicted latent trait distribution recording part 125 while at substantially the same time reading the distribution of the latent traits indicating the event execution result from the achieved latent trait distribution recording part 127, and comparing them with each other. The comparison is not that of the distribution itself of the latent traits, but the class type and the size coefficient are compared, so that the comparison result can be easily determined. In the case where a difference exists in the class type and the size coefficient, the subsequent process is executed on the assumption that there exists a difference between the prediction and the achievement. In the case where there is no difference in the class type and the size coefficient, on the other hand, the conclusion is output that the execution result is as predicted.

In the analysis apparatus 1, the difference between the prediction and the achievement constituting the result of comparison between the prediction and the achievement is classified by the process of the protective measure support part 105 under the control of the control mechanism 10 (at S507). In operation S507, the difference between the prediction and achievement can be classified into several types by comparing the class type and the size coefficient of the prediction with the achievement. In the case under consideration, an example is explained in which the difference is classified into three types including the type A in which the class type is the same but the size coefficient different, the type B in which the class type is different but only specified principal components are different, and the type C in which all the principal components are different or the R square value after verification of the regression analysis fails to exceed a threshold value.

In the analysis apparatus 1, the protective measure to obviate the difference between the prediction and the achievement of the distribution of the latent traits is derived according to the result of classification of the difference between the prediction and the achievement by the process of the protective measure support part 105 under the control of the control mechanism 10 (at S508). In the case where the difference is classified into type A in operation S508, for example, it is judged proper to correct the size of the campaign itself by enlarging the advertisement scale and the proposition is derived as a method to execute the protective measure by increasing the size. In the case where the difference is classified into type B, on the other hand, the event contents strengthening the specified principal components are searched for and derived as a protective measure from the event feature models recorded in the analysis result recording part 124. In the case where the difference is classified into type C, it is judged that a difficult situation prevails on the analogy of the event feature model indicating the past achievement and no specific protective measure is derived but only an alarm is issued that the difference between the prediction and the achievement is large.

In the analysis apparatus 1, the derived protective measure is output from the output mechanism 15 by the process of the protective measure support part 105 under the control of the control mechanism 10 (at S509). The operation S509 is the process in which the information such as the protective measure derived in operation S508 is displayed on the monitor and, if derived, printed out on the printer.

As described above, even in the case where the information for each user such as the attribute and the past purchase history of each user are not available, the analysis apparatus 1 according to the embodiment discussed herein analyzes the achievement of the user access on the first day of the campaign and, in the case where the schedule is different from the achievement, can propose a countermeasure. Specifically, according to the embodiment discussed herein, the distribution of the latent traits of the users on the first day of the campaign is predicted from the past achievement, and in the case where the prediction is different from the achievement, the difference between the prediction and the achievement is classified into any one of plural preset types and a proper plan can be proposed for each type.

Although the embodiments described above represent a case using a single unit of the analysis apparatus, the embodiment discussed herein is not limited to this configuration, and can be developed into various forms using plural apparatuses with the functions thereof distributed as required.

Although the embodiments described above represent a case in which the analysis apparatus is used to operate as a stand-alone apparatus, the embodiment discussed herein is not limited to this configuration, and can be developed into an ASP form in which the Web log is received from the Web server through the communication network such as the internet and an appropriate instruction transmitted to the Web server through the communication network as required.

Further, although the embodiments described above represent a case in which the URL is set an access destination, the embodiment discussed herein is not limited to this configuration, and can be developed into various forms such an application to the intranet including construction as an intranet, in which a separately set unique address such as the private IP address may be used other than the URL.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. An analysis apparatus incorporated in a computer and configured to access and analyze the contents recorded in a history recording part that records access records to a plurality of access destinations accessed by user terminals via a communication network, the analysis apparatus comprising:
    a history analysis part analyzing a trend of an access history for each unit period and deriving a latent trait indicating a latent possibility of access to a preset target access destination for each session from the contents recorded in the history recording part that records, for each session, an access history indicating an access or non-access to each of the plurality of access destinations and the preset target access destination, the preset target access destination being a subset destination of the plurality of access destinations indicating a level of completion relating to an access of one of the plurality of access destinations;
    a principal component analysis part analyzing principal components of a frequency distribution of the latent trait derived by the history analysis part for each unit period;
    a classification part classifying a correlation of the principal components for each unit period into a plurality of classes based on the analysis of the principal components;
    an event recording part recording, for each unit period, contents of one or more events executed to induce an access to the preset target access destination;
    a first generating part deriving a distribution of a latent trait for each principal component and generating a latent trait principal component table that stores a correspondence between each principal component and each latent trait;
    a second generating part generating a class construction ratio table that stores a correspondence between each class and a composition ratio of each principal component;
    a third generating part generating an event classification table that stores a correspondence between each class and the contents of each event; and
    an analysis result recording part recording the latent trait principal component table generated by the first generating part, the class construction ratio table generated by the second generating part and the event classification table generated by the third generating part, as an event feature model of an effect on execution of one of the one or more events.

2. The analysis apparatus according to claim 1, further comprising:
    an acceptance part accepting the input of the contents of an event scheduled to be executed; and
    a latent trait prediction part deriving the prediction of the distribution of the latent traits upon execution of a scheduled event based on the contents of the scheduled event accepted and the event feature model recorded in the analysis result recording part.

3. The analysis apparatus according to claim 2,
    wherein the latent trait prediction part
    derives the predicted class from the contents of the scheduled event based on the event classification table,
    derives the principal component construction ratio predicted from the predicted class based on the class construction ratio table, and
    derives the prediction of the distribution of the latent traits from the predicted principal component construction ratio based on the latent trait principal component table.

4. The analysis apparatus according to claim 2, further comprising:
    an access behavior model recording part recording the latent trait derived by the history analysis part as an access behavior model corresponding to the session associated with the access history;
    an execution result analysis part deriving the frequency distribution of the latent traits in an execution result accepted in the acceptance part based on an execution result and the access behavior model recorded in the access behavior model recording part;
    a prediction-achievement comparison part comparing the distribution of the latent traits predicted by the latent trait prediction part with the distribution of the latent traits derived by the execution result analysis part; and
    a protective measure support part classifying the difference in the distribution of the latent traits into one of a plurality of preset types based on the difference between the prediction and the achievement of the latent traits constituting the result of comparison by the prediction-achievement comparison part.

5. The analysis apparatus according to claim 4,
    wherein the history analysis part
    selects the access destination having the correlation of not less than a given value with the target access destination with respect to the access or non-access from the access history for each unit period recorded in the history recording part,
    sets each session in correspondence with the access or non-access to the selected access destination, and
    derives the latent traits for each session based on the result of analysis of the correspondence between each session and the access or non-access to the selected access destination according to the item response theory.

6. The analysis apparatus according to claim 5,
    wherein the classification part
    normalizes the score of each principal component based on the result of analysis of the principal components for each unit period in accordance with the result of dividing the score of the principal component by the size coefficient providing the total absolute value of the scores of the principal components, and
    classifies the correlation of the normalized scores of the principal components.

7. The analysis apparatus according to claim 4,
    wherein the classification part
    normalizes the score of each principal component based on the result of analysis of the principal components for each unit period in accordance with the result of dividing the score of the principal component by the size coefficient providing the total absolute value of the scores of the principal components, and
    classifies the correlation of the normalized scores of the principal components.

8. The analysis apparatus according to claim 2,
    wherein the history analysis part
    selects the access destination having the correlation of not less than a given value with the target access destination with respect to the access or non-access from the access history for each unit period recorded in the history recording part,
    sets each session in correspondence with the access or non-access to the selected access destination, and derives the latent traits for each session based on the result of analysis of the correspondence between each session and the access or non-access to the selected access destination according to the item response theory.

9. The analysis apparatus according to claim 8, wherein the classification part
normalizes the score of each principal component based on the result of analysis of the principal components for each unit period in accordance with the result of dividing the score of the principal component by the size coefficient providing the total absolute value of the scores of the principal components, and
classifies the correlation of the normalized scores of the principal components.

10. The analysis apparatus according to claim 2, wherein the classification part
normalizes the score of each principal component based on the result of analysis of the principal components for each unit period in accordance with the result of dividing the score of the principal component by the size coefficient providing the total absolute value of the scores of the principal components, and
classifies the correlation of the normalized scores of the principal components.

11. The analysis apparatus according to claim 1, wherein the history analysis part
selects the access destination having the correlation of not less than a given value with the target access destination with respect to the access or non-access from the access history for each unit period recorded in the history recording part,
sets each session in correspondence with the access or non-access to the selected access destination, and
derives the latent traits for each session based on the result of analysis of the correspondence between each session and the access or non-access to the selected access destination according to the item response theory.

12. The analysis apparatus according to claim 11, wherein the classification part
normalizes the score of each principal component based on the result of analysis of the principal components for each unit period in accordance with the result of dividing the score of the principal component by the size coefficient providing the total absolute value of the scores of the principal components, and
classifies the correlation of the normalized scores of the principal components.

13. The analysis apparatus according to claim 1, wherein the classification part
normalizes the score of each principal component based on the result of analysis of the principal components for each unit period in accordance with the result of dividing the score of the principal component by the size coefficient providing the total absolute value of the scores of the principal components, and
classifies the correlation of the normalized scores of the principal components.

14. An analysis method for causing a computer to function as an analysis apparatus which is configured to access and analyze contents recorded in a history recording log file that records access records to a plurality of access destinations accessed by user terminals via a communication network, the analysis method for causing the computer to execute:
analyzing a trend of an access history for each unit period and deriving the latent trait indicating a latent possibility of access to a preset target access destination for each session from the contents recorded in a history recording part that records, for each session, an access history indicating an access or non-access to each of the plurality of access destinations and the preset target access destination, the preset target access destination being a subset destination of the plurality of access destinations indicating a level of completion relating to an access of one of the plurality of access destinations;
analyzing principal components of a frequency distribution of the latent trait derived by the analyzing for each unit period;
deriving a distribution of a latent trait for each principal component and generating a latent trait principal component table that stores a correspondence between each principal component and each latent trait;
classifying a correlation of the principal components for each unit period into a plurality of classes based on the analysis result of the principal components executed in the analyzing;
recording, for each unit period, contents of one or more events executed to induce an access to the preset target access destination;
generating a class construction ratio table that stores a correspondence between each class and a composition ratio of each principal component;
generating an event classification table that stores a correspondence between each class and the contents of each event; and
recording the latent trait principal component table generated by the first generating, the class construction ratio table generated by the second generating and the event classification table generated by the third generating, as an event feature model of an effect on execution of one of the one or more events.

15. A non-transitory computer-readable recording medium storing a computer program for an analysis apparatus which is configured to access and analyze contents recorded in a history recording log file that records access records to a plurality of access destinations accessed by user terminals via a communication network, the computer program making the computer to execute:
analyzing a trend of an access history for each unit period and deriving the latent trait indicating a latent possibility of access to a preset target access destination for each session from the contents recorded in a history recording log file that records, for each session, an access history indicating an access or non-access to each of the plurality of access destinations and the preset target access destination, the preset target access destination being a subset destination of the plurality of access destinations indicating a level of completion relating to an access of one of the plurality of access destinations;
analyzing the principal components of a frequency distribution of the latent trait derived by the analyzing for each unit period;
deriving a distribution of a latent trait for each principal component and generating a latent trait principal component table that stores a correspondence between each principal component and each latent trait based on the analysis result of the principal components executed in the analyzing;
classifying a correlation of the principal components for each unit period into a plurality of classes based on the analysis result of the principal components executed in the analyzing;
generating a class construction ratio table that stores a correspondence between each class and a composition ratio of each principal component;

generating an event classification table that stores a correspondence between each class and the contents of each event; and recording the latent trait principal component table generated by the first generating, the class construction ratio table generated by the second generating and the event classification table generated by the third generating, as an event feature model of an effect on execution of one of the one or more events.

* * * * *

UNITED STATES PATENT AND TRADEMARK OFFICE
CERTIFICATE OF CORRECTION

PATENT NO. : 8,219,673 B2
APPLICATION NO. : 12/411930
DATED : July 10, 2012
INVENTOR(S) : Masashi Uyama It is certified that error appears in the above-identified patent and that said Letters Patent is hereby corrected as shown below:

Title Page, Item (56), Col. 2 (Other Publications), Line 2, Delete "(Intoduction))" and insert -- (Introduction)) --, therefor.

Title Page, Item (56), Col. 2 (Other Publications), Line 5, Delete "(Intoduction))" and insert -- (Introduction)) --, therefor.

Signed and Sealed this
Twenty-fifth Day of September, 2012

David J. Kappos
*Director of the United States Patent and Trademark Office*